(12) United States Patent
Line et al.

(10) Patent No.: US 12,179,635 B2
(45) Date of Patent: Dec. 31, 2024

(54) VEHICLE SEATING SYSTEM FOR A STATIONARY VEHICLE

(71) Applicant: Ford Global Technologies, LLC, Dearborn, MI (US)

(72) Inventors: Johnathan Andrew Line, Northville, MI (US); Robert Allen Bastuba, Jr., Macomb, MI (US); Collin Joshua Smith, Royal Oak, MI (US); Robert Charles Shipley, Westland, MI (US); Francisco Edgar Guizar Ramirez, Mexico City (MX); Scott Culver Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 17/699,781

(22) Filed: Mar. 21, 2022

(65) Prior Publication Data
US 2023/0294563 A1  Sep. 21, 2023

(51) Int. Cl.
*B60N 2/01* (2006.01)
*B60N 2/02* (2006.01)

(52) U.S. Cl.
CPC ........... *B60N 2/012* (2013.01); *B60N 2/0292* (2013.01)

(58) Field of Classification Search
CPC .... B60N 2/012; B60N 2/0292; B60N 2/3095; B60N 2/3097; B60N 2/91; B60N 2/005; B60N 2/28; B60N 2/283; B60N 2/2854; B60N 2/2881; B60N 2/2824; B60N 2/2827; B60P 3/36; B60P 3/341

USPC .......... 296/67, 66, 63, 64, 65.03; 108/50.17; 297/219.1, 250.1, 256.1, 256.16; 5/122, 5/124, 119

See application file for complete search history.

(56) References Cited

U.S. PATENT DOCUMENTS

| 3,600,033 A | 8/1971 | Holdampf et al. |
| 4,005,898 A * | 2/1977 | Way .................. B60P 3/423 5/118 |
| 4,009,903 A | 3/1977 | Manspeaker |

(Continued)

FOREIGN PATENT DOCUMENTS

CN          112315184 A      2/2021

OTHER PUBLICATIONS

U.S. Appl. No. 17/700,018, filed Mar. 21, 2022, Seating Solutions for a Stationary Vehicle.

(Continued)

*Primary Examiner* — Amy R Weisberg
*Assistant Examiner* — Enwei Zhuo
(74) *Attorney, Agent, or Firm* — Vichit Chea; Price Heneveld LLP

(57) ABSTRACT

A seating system for a vehicle includes a first sidewall and a second sidewall. A second sidewall opposes the first sidewall. The first sidewall and the second sidewall at least partially define a cargo space. A first seating assembly is coupled to the first sidewall. A second seating assembly is coupled to the first sidewall. A bench seat is configured to be selectively adjustable between an adjacent support position and a cross support position. The bench seat is coupled to the first seating assembly and the second seating assembly when in the adjacent support position. The bench seat is coupled to the first sidewall and the second sidewall in the cross support position.

19 Claims, 17 Drawing Sheets

(56) References Cited

U.S. PATENT DOCUMENTS

| | | | |
|---|---|---|---|
| 4,679,840 A | 7/1987 | Fry et al. | |
| 4,682,438 A | 7/1987 | Arrow | |
| 5,078,443 A | 1/1992 | Austin | |
| 5,139,301 A * | 8/1992 | Lewis | B60N 2/3095 |
| | | | 297/254 |
| 5,170,521 A * | 12/1992 | Light | A47C 17/84 |
| | | | 5/118 |
| 5,516,179 A * | 5/1996 | Tidwell | B62D 33/0612 |
| | | | 296/64 |
| 6,161,486 A | 12/2000 | Boots | |
| 6,230,340 B1 * | 5/2001 | Edwards | B60P 3/38 |
| | | | 5/118 |
| 6,364,391 B1 | 4/2002 | Everett | |
| 6,651,469 B2 * | 11/2003 | Arias | B60N 2/24 |
| | | | 410/151 |
| 6,668,397 B2 * | 12/2003 | Olenick | B62D 33/06 |
| | | | 5/118 |
| 6,729,685 B1 | 5/2004 | Ebalobor | |
| 6,932,408 B1 | 8/2005 | Lyod, Jr. et al. | |
| 7,159,939 B2 | 1/2007 | Brown et al. | |
| 7,578,551 B2 * | 8/2009 | Linero | B64D 11/0693 |
| | | | 297/42 |
| 8,011,714 B2 * | 9/2011 | Parkinson | B60N 2/3077 |
| | | | 296/65.09 |
| 8,117,691 B2 | 2/2012 | Bishop | |
| 8,528,976 B2 | 9/2013 | Wimberley | |
| 9,179,759 B1 * | 11/2015 | Turner | A45F 3/24 |
| 9,199,553 B2 | 12/2015 | Cuddihy et al. | |
| 9,340,126 B2 | 5/2016 | Cuddihy et al. | |
| 9,393,887 B1 | 7/2016 | Beis | |
| 9,878,675 B2 | 1/2018 | George et al. | |
| 10,081,272 B2 | 9/2018 | De Saulles | |
| 10,500,993 B2 | 12/2019 | Yacob | |
| 2004/0113451 A1 | 6/2004 | Szymanski et al. | |
| 2008/0246298 A1 | 10/2008 | Leigh-Monstevens | |
| 2018/0229631 A1 | 8/2018 | Yacob | |
| 2019/0219081 A1 | 7/2019 | Hagedorn et al. | |
| 2020/0139860 A1 | 5/2020 | Sakurai | |
| 2020/0290484 A1 | 9/2020 | Line et al. | |
| 2020/0376986 A1 | 12/2020 | Line et al. | |
| 2021/0229572 A1 | 7/2021 | Line et al. | |
| 2021/0229580 A1 | 7/2021 | Waters-Banks | |

OTHER PUBLICATIONS

U.S. Appl. No. 17/699,952, filed Mar. 21, 2022, Seat-Mounted Work Surface.

U.S. Appl. No. 17/700,057, filed Mar. 21, 2022, Seating Solutions for a Stationary Vehicle.

U.S. Appl. No. 17/700,081, filed Mar. 21, 2022, Seating Solutions for a Stationary Vehicle.

U.S. Appl. No. 17/699,981, filed Mar. 21, 2022, Seating Solutions for a Vehicle.

U.S. Appl. No. 17/699,755, filed Mar. 21, 2022, Seating Assembly with Swivel Capability.

U.S. Appl. No. 17/699,996, filed Mar. 21, 2022, Seating Assembly with Swivel Capability.

U.S. Appl. No. 17/700,007, filed Mar. 21, 2002, Vehicle Floor Panel.

* cited by examiner

1

VEHICLE SEATING SYSTEM FOR A STATIONARY VEHICLE

FIELD OF THE DISCLOSURE

The present disclosure generally relates to a seating system, and more particularly, to a seating system for a stationary vehicle.

BACKGROUND OF THE DISCLOSURE

Vehicles often include seats within a passenger cabin. The seats are often adjustable between different configurations. The different configurations may include an upright position to support a person thereon and a lowered position to increase storage space. While all modern Original Equipment Manufacturers (OEMs) of passenger vehicles currently warn occupants against sitting in the bed of a pickup truck while the vehicle is moving due to safety concerns, it is anticipated that technology and the regulatory framework may evolve in the future to where such an activity is safe and permissible.

SUMMARY OF THE DISCLOSURE

According to at least one aspect of the present disclosure, a vehicle includes a body defining a cargo space. The body includes a first sidewall and a second sidewall that at least partially define the cargo space. The first sidewall defines a first wheel housing, and the second sidewall defines a second wheel housing. A first seating assembly is coupled to the first sidewall on a first side of the first wheel housing. A second seating assembly is coupled to the first sidewall on a second side of the first wheel housing. The first seating assembly and the second seating assembly are each operable between a stowed position, abutting the first sidewall, and a deployed position, extending from the first sidewall. A bench seat is configured to selectively couple to each of the first seating assembly and the second seating assembly in an adjacent support position and each of the first sidewall and the second sidewall in a cross support position.

According to another aspect of the present disclosure, a seating system for a vehicle includes a first sidewall and a second sidewall. A second sidewall opposes the first sidewall. The first sidewall and the second sidewall at least partially define a cargo space. A first seating assembly is coupled to the first sidewall. A second seating assembly is coupled to the first sidewall. A bench seat is configured to be selectively adjustable between an adjacent support position and a cross support position. The bench seat is coupled to the first seating assembly and the second seating assembly when in the adjacent support position. The bench seat is coupled to the first sidewall and the second sidewall in the cross support position.

According to another aspect of the present disclosure, a vehicle seating system includes a first sidewall at least partially defining a cargo space. The first sidewall defines a wheel housing. A first seating assembly is coupled to the first sidewall on a first side of the wheel housing. A second seating assembly is coupled to the first sidewall on a second side of the wheel housing. Each of the first seating assembly and the second seating assembly includes a seat base operable between a stowed position and a deployed position. A bottom surface of the seat base is disposed adjacent to the first sidewall when in the stowed position. Each of the first seating assembly and the second seating assembly also includes a leg support operably coupled to the seat base. The leg support is operable between a storage position and a supporting position. A bench seat is coupled to the first seating assembly and the second seating assembly when in an adjacent support position to define a seating space over the wheel housing between the first seating assembly and the second seating assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
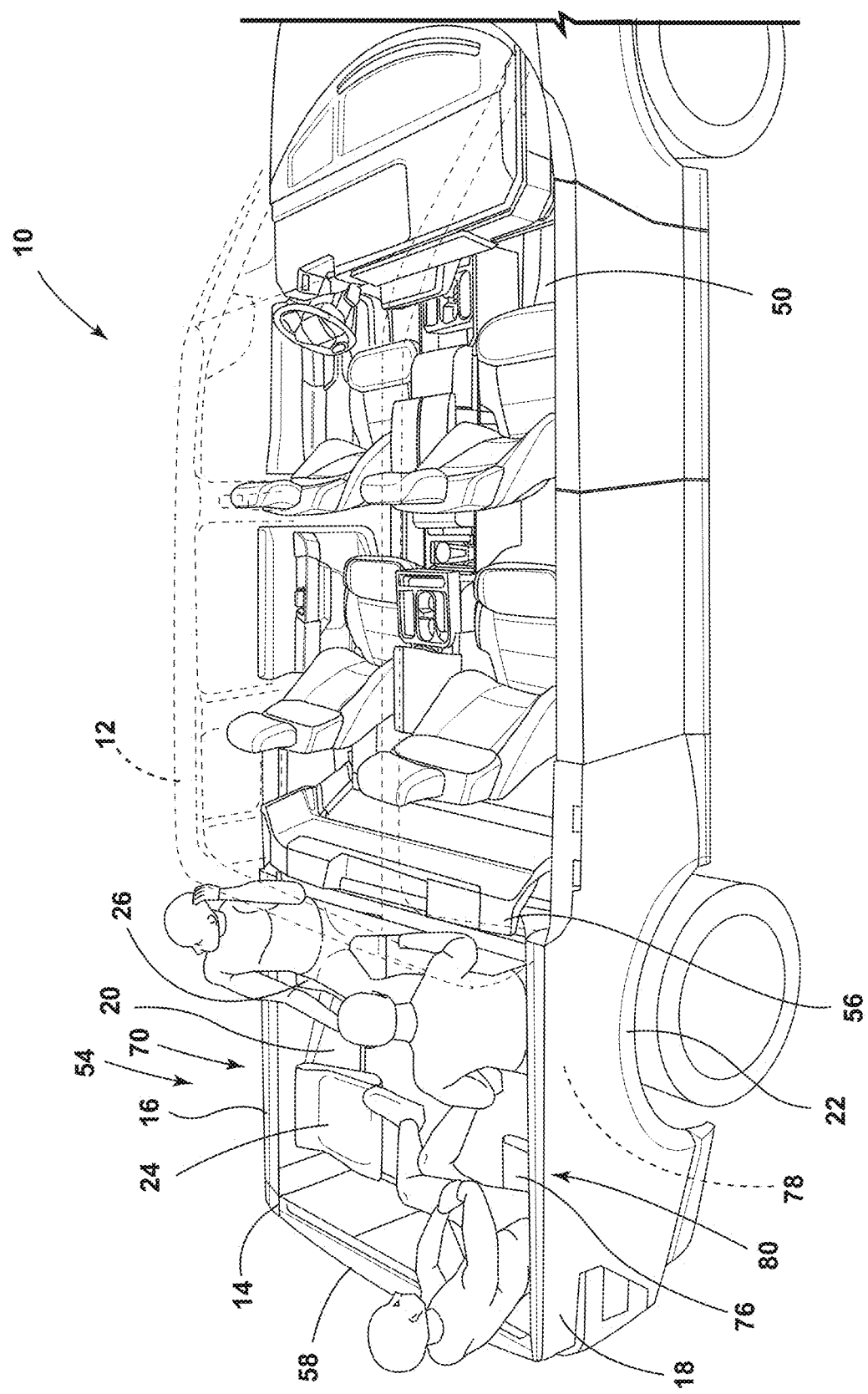
FIG. 1 is a side perspective view of a vehicle with a seating system in a cargo space for use when the vehicle is in a stationary state, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-17, reference numeral 10 generally designates a vehicle 10 that includes a body 12 defining a cargo space 14. The body 12 includes a first sidewall 16 and a second sidewall 18 that at least partially defines the cargo space 14. The first sidewall 16 defines a first wheel housing 20, and the second sidewall 18 defines a second wheel housing 22. A first seating assembly 24 is coupled to the first sidewall 16 on a first side of the first wheel housing 20. A second seating assembly 26 is coupled to the first sidewall 16 and a second side of the first wheel housing 20. The first seating assembly 24 and the second seating assembly 26 are each operable between a stowed position 28, abutting the first sidewall 16, and a deployed position 30, extending from the first sidewall 16, which are generally configured to be used when the vehicle 10 is stationary or in a non-moving state. A supplementary support member 32, such as a bench seat 34, is configured to selectively couple to each of the first seating assembly 24 and the second seating assembly 26 in an adjacent support position 36 and to each of the first sidewall 16 and the second sidewall 18 in a cross support position 38.

Referring to FIG. 1, the vehicle 10 includes the body 12, which typically defines a passenger compartment 50 and the cargo space 14. The passenger compartment 50 and the cargo space 14 in the illustrated example are separated by the body 12 but may be part of the same area within the vehicle 10 without departing from the teachings herein. The vehicle 10 is illustrated as a truck, which has at least one seating row of interior seats within the passenger compartment 50, as well as the cargo space 14 separate from the passenger compartment 50. The cargo space 14 is configured as a truck bed or bed at least partially defined by the sidewalls 16, 18.

The first sidewall 16 and the second opposing sidewall 18 are collectively referred to herein as sidewalls 54. A cabin wall 56 that at least partially defines the passenger compartment 50 extends between vehicle-forward edges of the first sidewall 16 and the second sidewall 18, and a tailgate 58 extends between vehicle-rearward edges of the first and second sidewalls 16, 18. The tailgate 58 is generally operable between a raised position for at least partially enclosing the cargo space 14 and a lowered position for providing increased access to the cargo space 14.

Referring still to FIG. 1, the vehicle 10 includes a seating system 70 disposed within the cargo space 14. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible. Accordingly, the seating system 70 may be utilized in accordance with current safety and regulatory framework. The seating system 70 provides flexible and adjustable seating arrangements and configurations within the cargo space 14 of the vehicle 10. In the truck illustrated in FIG. 1, the seating system 70 provides an exterior seating experience in addition to the interior seating arrangements within the passenger compartment 50. In the exemplary configuration in FIG. 1, the seating system 70 includes the first and second seating assemblies 24, 26 coupled to the first sidewall 16 and third and fourth seating assemblies 76, 78 coupled to the second sidewall 18. The first, second, third, and fourth seating assemblies 24, 26, 76, 78 are collectively referred to herein as seating assemblies 80.

The seating system 70 provides a variety of seating arrangements that may be referred to as social arrangements, conferencing arrangements, remote office arrangements, etc. These arrangements are generally intended for use when the vehicle 10 is in a stationary, non-moving state (e.g., when the vehicle 10 is parked). Currently, all modern OEMs of passenger vehicles 10 warn occupants against sitting in the bed of a pickup truck while the vehicle 10 is moving due to safety concerns. OEMs that warn against sitting in the truck bed may consider and/or implement lockout technology to prevent the use of the seating system 70 in the truck bed while the vehicle 10 is moving. However, it is anticipated that technology and the regulatory framework may evolve in the future to where such an activity is safe and permissible.

The first sidewall 16 defines the first wheel housing 20, and the second sidewall 18 defines the second wheel housing 22. Generally, the first and second seating assemblies 24, 26 are disposed on opposing sides of the first wheel housing 20, while the third and fourth seating assemblies 76, 78 are disposed on opposing sides of the second wheel housing 22. Depending on the size of the cargo space 14, the size of the passenger compartment 50, and the configuration of the vehicle 10, the seating assemblies 80 may each be disposed adjacent to the respective wheel housing 20, 22 without extending over the wheel housing 20, 22. Alternatively, one or more of the seating assemblies 80 may extend at least partially over the respective wheel housing 20, 22.

Though illustrated in FIG. 1 as a truck, the seating system 70 may be utilized in additional styles of vehicle 10 without departing the teachings herein. When used in other styles of vehicles 10, the use of the seating system 70 may align with the current OEM warnings, technology, and regulatory framework. The vehicle 10 may be a manually operated vehicle 10 (e.g., with a human driver), a fully autonomous vehicle 10 (e.g., with no human driver), or a partially autonomous vehicle 10 (e.g., operated with or without a human driver) that includes the seating system 70 to be used while the vehicle 10 is stationary, parked, or otherwise in a non-moving state. Separate from the seating system 70, the vehicle 10 may also be utilized for personal and/or commercial purposes, such as, for example, ride-providing services (e.g., chauffeuring), ridesharing services, and delivery or transport services.

Figure 2:
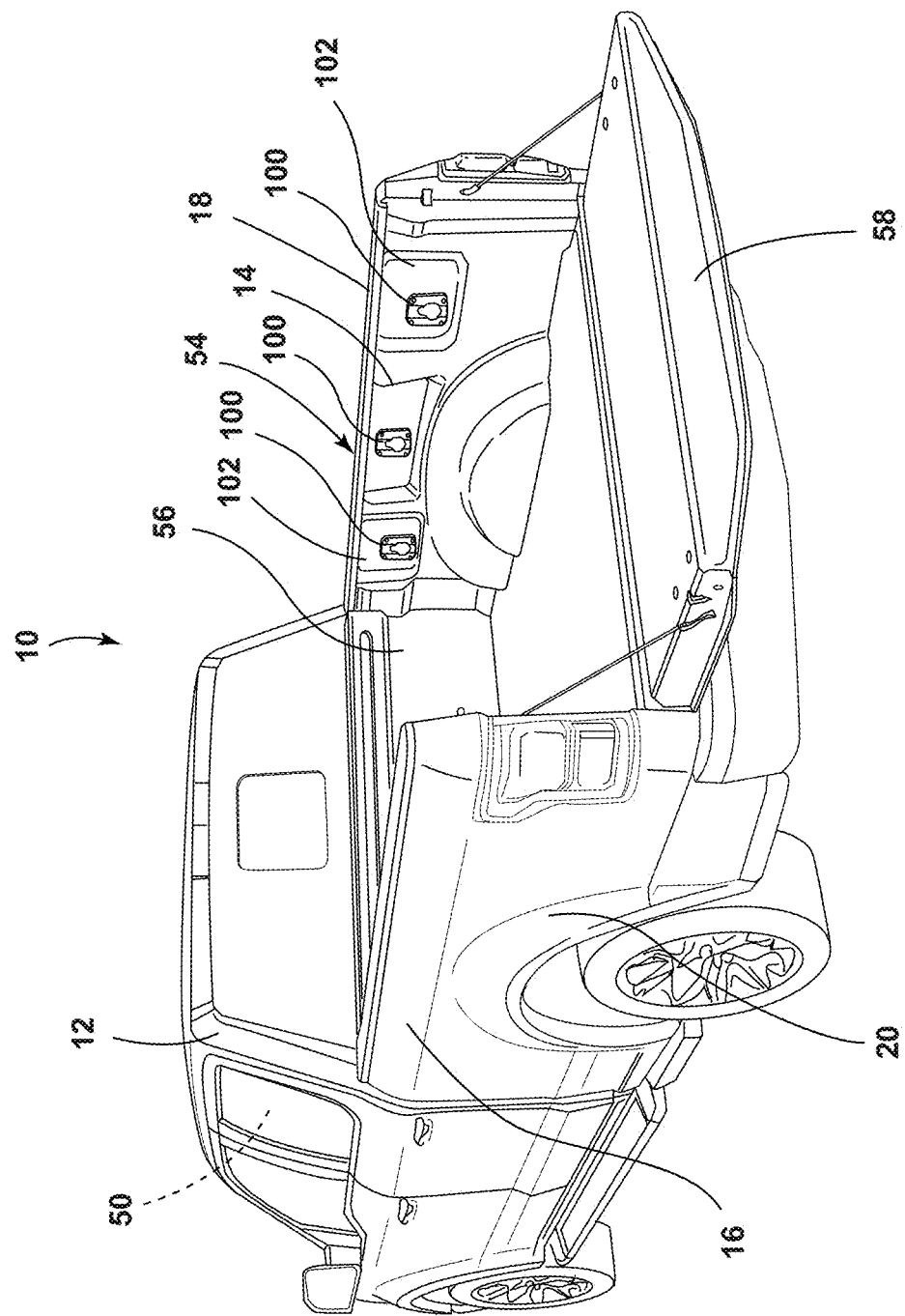
FIG. 2 is a rear perspective view of a cargo space within a vehicle that includes mounting brackets on sidewalls of the vehicle, according to the present disclosure.
Figure 3:
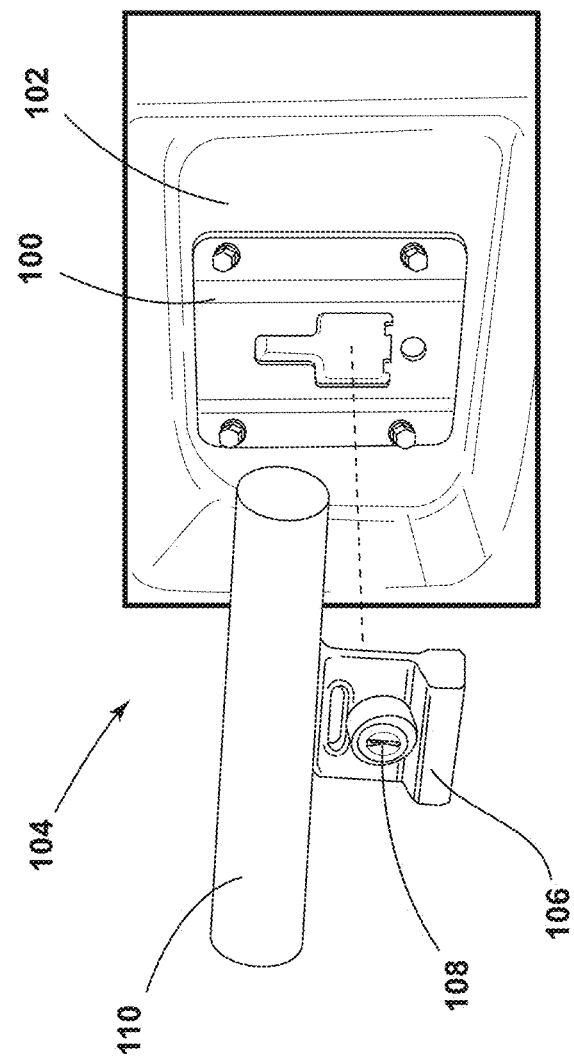
FIG. 3 is an exploded side perspective view of a support feature configured to engage a mounting bracket on a sidewall of a vehicle, according to the present disclosure.

Referring to FIGS. 2 and 3, the vehicle 10 includes mounting brackets 100 that are coupled to the first and second sidewalls 16, 18. For example, as illustrated in FIG. 2, one of the second sidewall 18 is illustrated with three mounting brackets 100. The second sidewall 18 is illustrated with one mounting bracket 100 on each side of the second wheel housing 22 and one above the wheel housing 22. The mounting brackets 100 are each disposed within a recessed region 102, though other configurations of the engagement between the second sidewall 18 and the mounting brackets 100 are contemplated without departing from the teachings herein. Further, the vehicle 10 may include additional or fewer mounting brackets 100 without departing from the teachings herein.

Referring still to FIG. 3, one of the mounting brackets 100 coupled to the one of the sidewalls 54 is illustrated. The mounting bracket 100 provides a universal or common mounting point for interchangeable accessories for the vehicle 10. For example, an exemplary support feature 104 that engages the mounting bracket 100 and one of the seating assemblies 80 (FIG. 1) is shown in relation to the mounting bracket 100. The support feature 104 includes a mounting portion 106 configured to interlock with the mounting bracket 100. The mounting portion 106 also includes a lock 108 for securing the mounting portion 106 to the mounting bracket 100. The illustrated support features 104 includes a support bar 110 coupled to the mounting portion 106. The support bar 110 is configured to engage with the respective seating assembly 80 (FIG. 1). The support bar 110 generally extends in the fore-aft direction within the cargo space 14. Additional or alternative configurations of the support feature 104 may be utilized without departing from the teachings herein.

Figure 13:
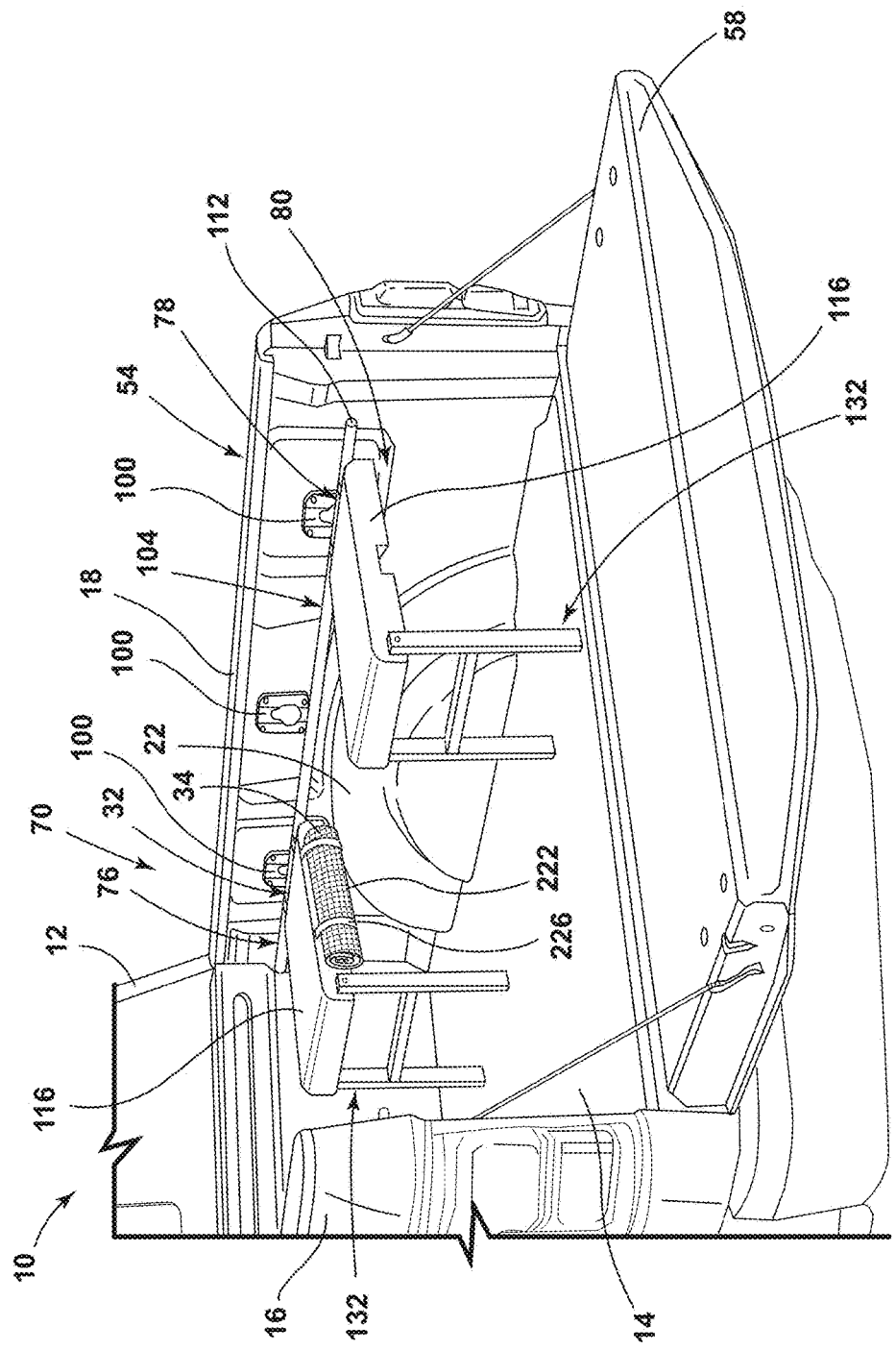
FIG. 13 is a side perspective view of a seating system in a cargo space of a vehicle for use when the vehicle is in a stationary state with seating assemblies in deployed positions and a bench seat in a storage position within a storage feature, according to the present disclosure.

Referring again to FIG. 1 and still to FIG. 3, each seating assembly 80 engages separate support features 104. Alternatively, the seating assemblies 80 coupled to the same sidewall 54 (e.g., the first and second seating assemblies 24, 26 or the third and fourth seating assemblies 76, 78) may be configured to couple with a single support feature 104. In such examples, the support features 104 may include a support beam 112 (as best illustrated in FIG. 13) and multiple mounting portions 106 to engage multiple mounting brackets 100. In this way, the support beam 112 extends in the fore-aft direction along respective of sidewall 54 and engages multiple seating assemblies 80.

The support features 104 may be separate from the seating assembly 80. In such examples, the support features 104 is configured to selectively couple with the seating assembly 80 to couple the seating assembly 80 to the respective sidewall. Alternatively, the support feature 104 may be coupled with the seating assembly 80, such that the support features 104 is part of the seating assembly 80 (i.e., a single unit). In such examples, the engagement of the support features 104 to the mounting bracket 100 automatically couples the seating assembly 80 to the respective sidewall 54.

Figure 4:
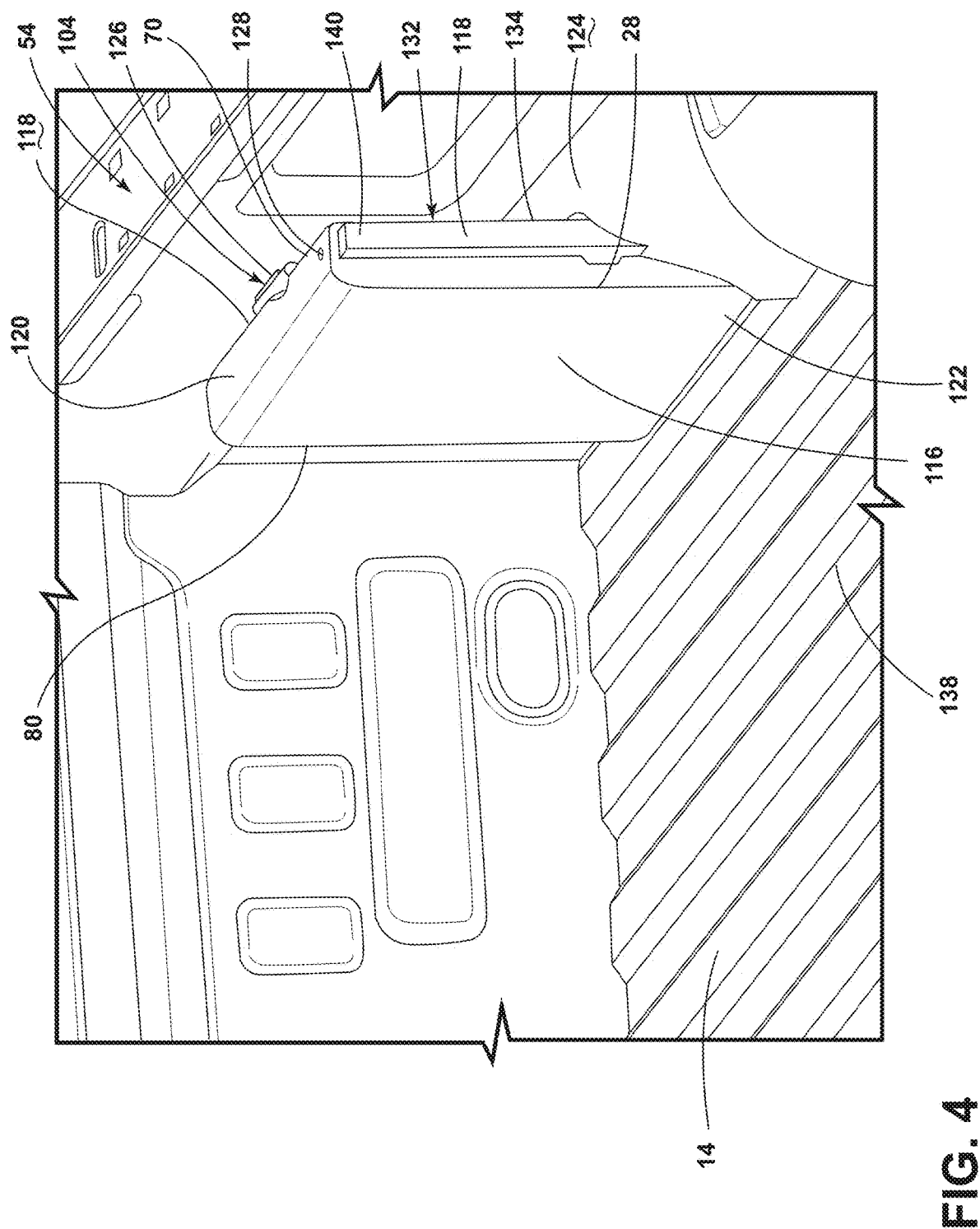
FIG. 4 is a side perspective view of a seating assembly of a vehicle seating system within a cargo space, where a seat base is in a stowed position, according to the present disclosure.
Figure 5:
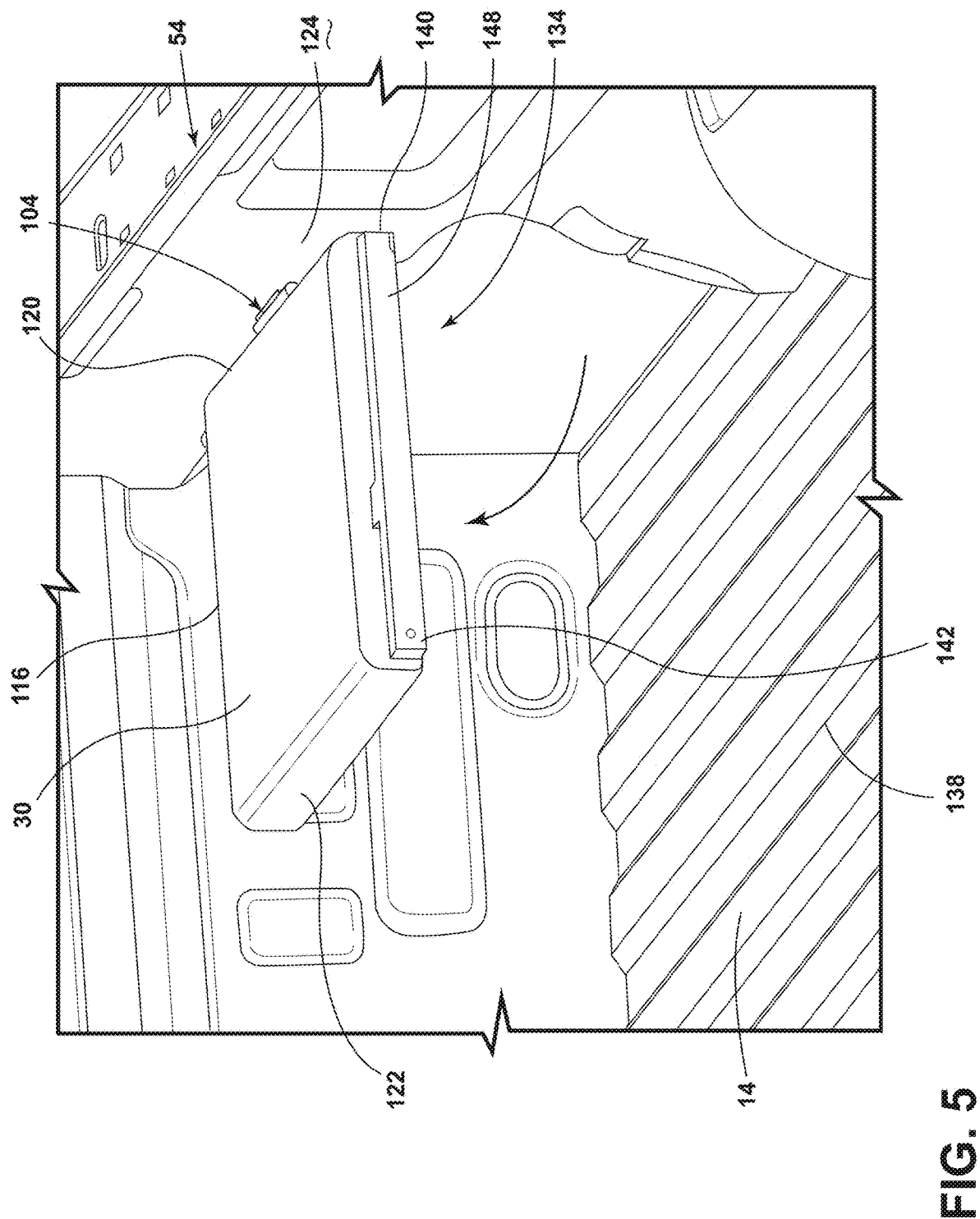
FIG. 5 is a side perspective view of a seating assembly of a vehicle seating system within a cargo space for use when the vehicle is in a stationary state, where a seat base is in a deployed position and a leg support is in a storage position, according to the present disclosure.
Figure 6:
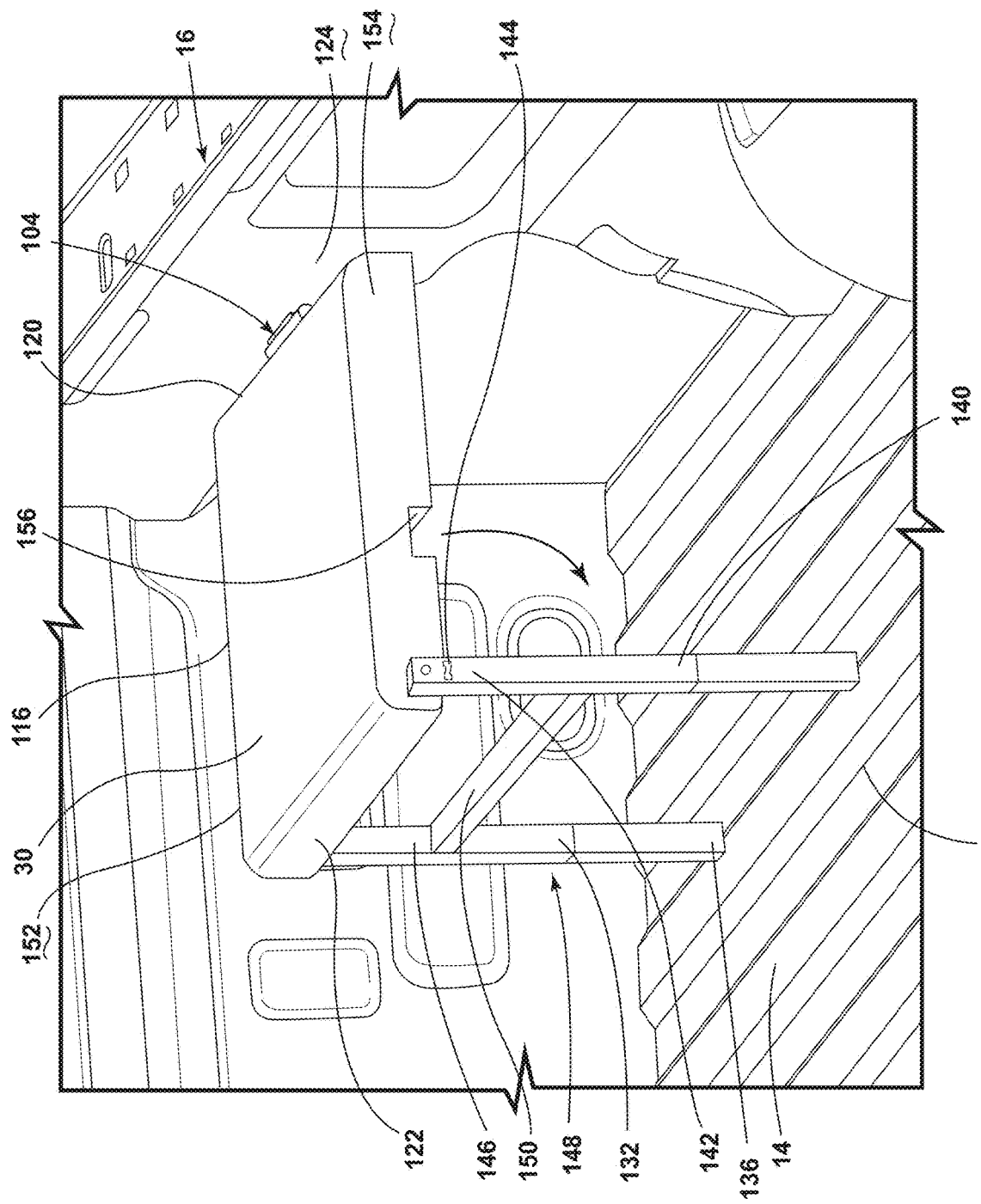
FIG. 6 is a side perspective view of a seating assembly of a vehicle seating system within a cargo space for use when the vehicle is in a stationary state, where a seat base is in a deployed position and a leg support is in a supporting position, according to the present disclosure.

Referring to FIGS. 4-6, one of the seating assemblies 80 is illustrated coupled to one of the sidewalls 54 for use in accordance with the current OEM warnings, technology, and regulatory framework. It is understood that each seating assembly 80 is configured in the same way and engages the respective sidewall 54 in a similar manner as described herein. The seating assembly 80 includes a seat base 116 with a bottom surface 118, a proximal end 120 coupled to the sidewall, and a distal end 122 configured to move relative to the sidewall 54 based on the position of the seat base 116.

The seat base 116 is configured to rotate between the stowed position 28 and the deployed position 30. When in the stowed position 28, the bottom surface 118 of the seat base 116 is disposed adjacent to and extends along an inner surface 124 of the sidewall. Accordingly, both the proximal end 120 and the distal end 122 are disposed adjacent to the inner surface 124, and the seat base 116 is disposed generally parallel to the sidewall 54.

As the seat base 116 rotates from the stowed position 28 to the deployed position 30, the distal end 122 of the seat base 116 is configured to move from adjacent to the sidewall to being generally horizontally aligned with the proximal end 120 of the seat base 116. In this way, when in the deployed position 30, the distal end 122 is spaced from the inner surface 124, and the seat base 116 is configured to extend generally perpendicular from the inner surface 124 of the sidewall 54. In the stowed position 28, the seating assembly 80 is more compact and provides additional storage in the cargo space 14. When in the deployed position 30, the seating assembly 80 provides an exterior seating space for a user or a passenger. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible.

A coupling feature 126 or coupling features 126 are coupled to the proximal end 120 of the seat base 116. The coupling features 126 may be configured for engaging and disengaging the seat base 116 from the support features 104. The coupling feature 126 may be hooks, C-shaped clips, snap features, D-rings, etc. In additional non-limiting examples, the support feature 104 may have mating structures configured to mate with the coupling features 126. In additional non-limiting examples, the support features 104 may have mating structures configured to mate with the coupling features 126 to couple the support features 104 to the seat base 116. Additionally or alternatively, when the seat base 116 and the support feature 104 are part of a single unit, the coupling features 126 may be rings that extend about an inner shaft of the support feature 104, D-shaped caps that engage ends of the support feature 104, etc. In such examples, the coupling features 126 may not be configured to disengage from the support feature 104.

At least one of the seat base 116, the support features 104, and the coupling feature 126 includes a locking or latching member 128 for retaining the seat base 116 in the deployed position 30. The latching members 128 may be able to support some or all the weight of a person seated on the seat base 116. In such examples, the latching members 128 may retain the seat base 116 in the deployed position 30 for supporting the person thereon. Alternatively, the latching member 128 may not support the weight of the person but may be utilized to retain the seat base 116 in the deployed position 30, allowing the user to adjust a leg support 132. Currently, all modern OEMs of passenger vehicles 10 currently warn occupants against sitting in the bed of a pickup truck while the vehicle 10 is moving due to safety concerns. OEMs that warn occupants of this use may consider and/or implement lockout technology to prevent use of the seating system 70 while the vehicle is moving. However, it is also anticipated that technology and the regulatory framework may evolve in the future to where such an activity of sitting in the bed of a pickup truck while the vehicle 10 is moving is safe and permissible.

Referring still to FIGS. 4-6, the seating assembly 80 includes the leg support 132, which is coupled to the seat base 116 and includes a first end 140 and a second end 142. The leg support 132 is operable between a storage position 134 and a supporting position 136. In various examples, the first end 140 of the leg support 132 is disposed proximate to the sidewall 54 when in the storage position 134 and configured to engage a floor 138 of the cargo space 14 when in the supporting position 136.

As best illustrated in FIG. 4, when the seat base 116 is in the stowed position 28 and the leg support 132 is in the storage position 134, the leg support 132 is disposed adjacent to the inner surface 124 of the sidewall 54. In various aspects, at least a portion of the leg support 132 may extend between the seat base 116 and the sidewall 54. As best illustrated in FIG. 5, when the seat base 116 is in the deployed position 30 and the leg support 132 is in the storage position 134, the first end 140 is disposed proximate to the distal end 122 of the seat base 116, while the second end 142 is disposed proximate to the first sidewall 16. At least one of the leg support 132 and the seat base 116 may include a retaining feature 144 configured to retain the leg support 132 in the storage position 134. This may be advantageous to reduce or prevent movement of the leg support 132 as the seat base 116 is being rotated.

Figure 7:
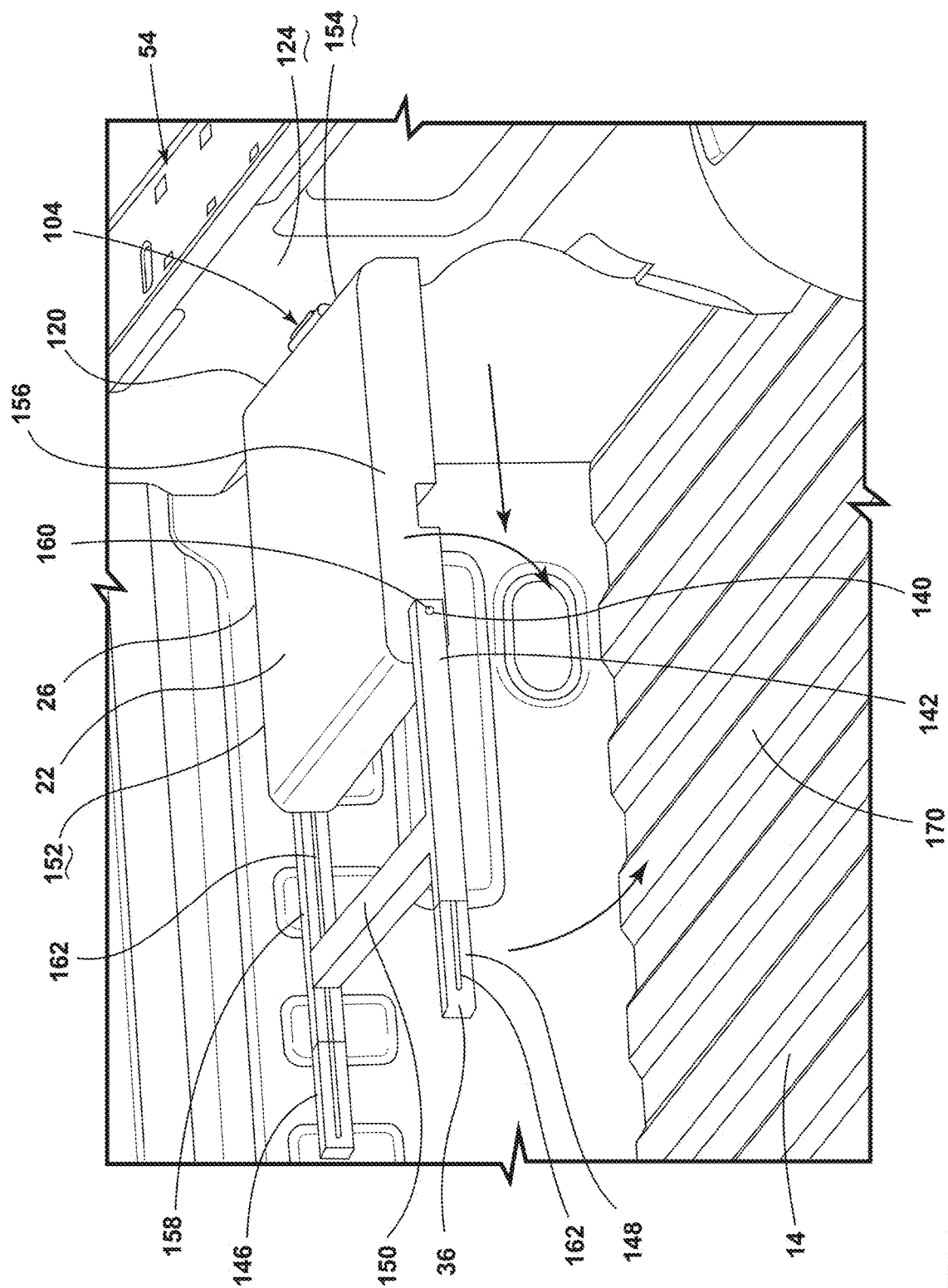
FIG. 7 is a side perspective view of a seating assembly of a vehicle seating system within a cargo space for use when the vehicle is in a stationary state, where a seat base is in a deployed position and a leg support is in an intermediate position, according to the present disclosure.

The leg support 132 generally includes two leg portions 146, 148, which are spaced on opposing sides of the seat base 116 and are arranged parallel to one another. The leg portions 146, 148 are generally coupled via a connector 150. The connector 150 may be a single bar, as best illustrated in FIG. 7, or may be multiple bars that are parallel, intersecting, or otherwise arranged relative to one another. When the leg support 132 is in the storage position 134, the leg portions 146, 148 are arranged adjacent to or abutting opposing side surfaces 152, 154 of the seat base 116. The bottom surface 118 of the seat base 116 generally defines a channel 156 that extends from one side surface 152 to the opposing side surface 154. The connector 150 is configured to be disposed within the channel 156 when the leg support 132 is in the storage position 134. This configuration provides for a more compact storing arrangement of the leg support 132.

In the example illustrated in FIGS. 5 and 6, the first end 140 of the leg support 132 is rotatably coupled to the distal end 122 of the seat base 116. The second end 142 of the leg support 132 rotates approximately 90° from adjacent to the first sidewall 16 to adjacent to the floor 138 of the cargo space 14. The retaining feature 144, or a separate feature, may then lock or retain the leg support 132 in the supporting position 136. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible.

Referring still to FIG. 7, in various examples, the leg support 132 may be operable between the storage position 134, an intermediate position 158, and the supporting position 136. The leg support 132 may be configured to slide relative to the seat base 116 from the storage position 134 to the intermediate position 158. In certain aspects, the seat base 116 includes pins 160 that engage channels or slots 162 of the leg portions 146, 148 of the leg support 132. In alternative examples, the leg portions 146, 148 of the leg support 132 includes the pins 160 that engage the channels or slots 162 in the side surfaces 152, 154 of the seat base 116. The leg support 132 is configured to slide away from the sidewall 54 in a movement path that is generally parallel with the seat base 116 until the first end 140 of the leg support 132 is adjacent to the proximal end 120 of the seat base 116. In this way, the leg support 132 extends generally parallel with the seat base 116. The first end 140 of the leg support 132 is rotatably coupled to the seat base 116, and the second end 142 of the leg support 132 is configured to rotate about 90° to engage the floor 138 of the cargo space 14.

Figure 8:
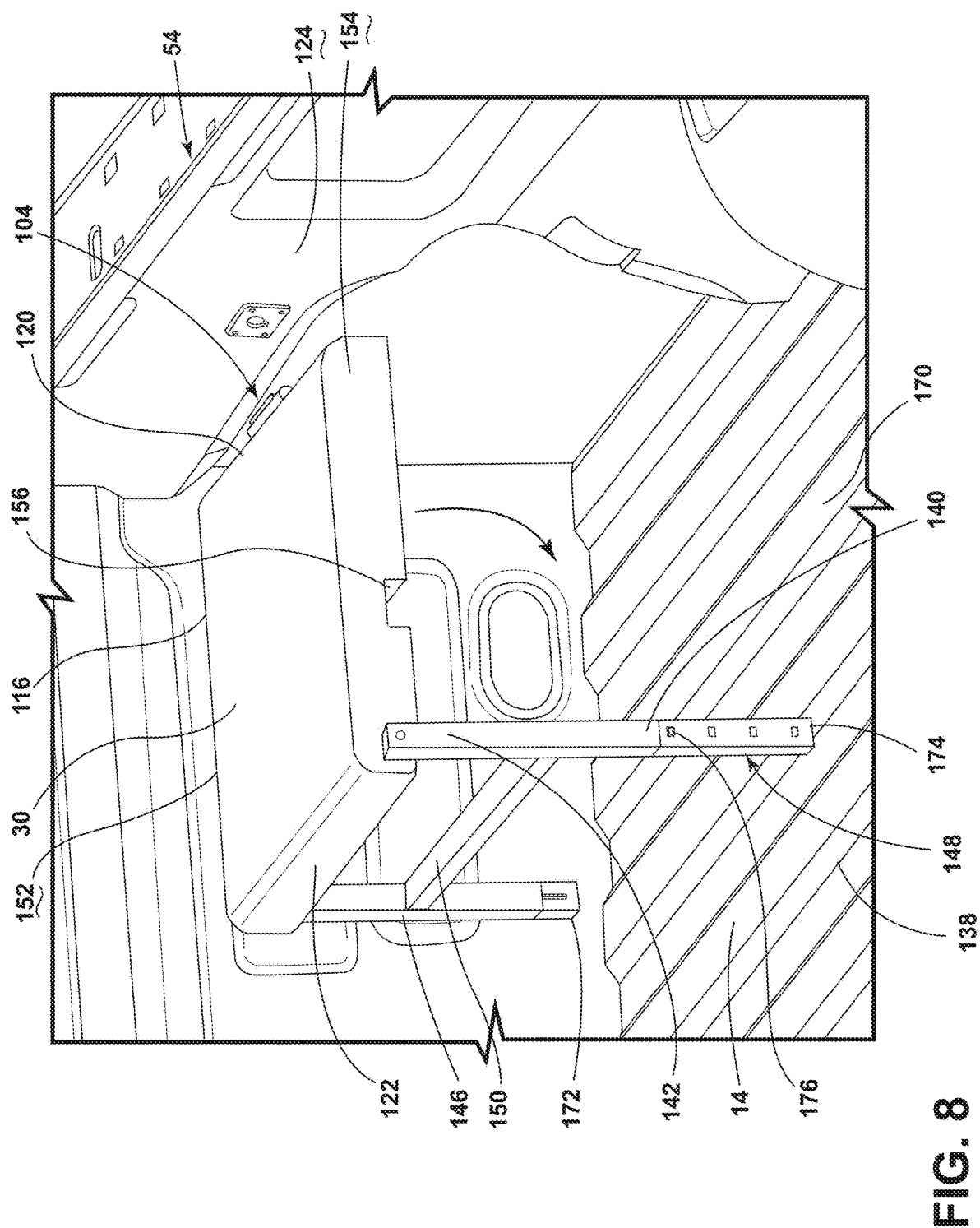
FIG. 8 is a side perspective view of a seating assembly of a vehicle seating system for use when the vehicle is in a stationary state, where a leg support includes a first leg portion in a nested position and a second leg portion in an extended position, according to the present disclosure.

Referring to FIG. 8, a height or length of the leg support 132 may be adjustable. In this way, the leg support 132 may be adjusted to change the positioning of the seat base 116 relative to the sidewall 54 (e.g., the angle at which the seat base 116 extends). The change in the seat base 116 position may be advantageous for increasing the comfort of the person on the seating assembly 80. Additionally or alternatively, if there are items on the floor 138 of the cargo space 14 or the floor 138 is uneven, such as having ribs 170 as illustrated in FIG. 8, the leg portions 146, 148 may be configured to adjust to provide increased stability. All modern OEMs of passenger vehicles 10 currently warn occupants against sitting in the bed of a pickup truck while the vehicle 10 is moving due to safety concerns. However, it is anticipated that technology and the regulatory framework may evolve in the future to where such an activity is safe and permissible.

In certain aspects, the leg support 132 is configured to telescope between a nested or retracted position 172 and an extended position 174. Each leg portion 146, 148 may be separately adjustable, as illustrated in FIG. 8, or alternatively, the leg portions 146, 148 may be adjustable as a unit above and/or below the connector 150. It is also contemplated that the connector 150 may be selectively engaged and disengaged from the leg portions 146, 148 to provide additional adjustability to the leg support 132.

In examples where the leg support 132 is adjustable, the leg support 132 may include a latching and locking feature 176 configured to retain the leg support 132 in the selected position. In certain aspects, the leg support 132 may be at any height when rotated to the storage position 134. Additionally or alternatively, the leg support 132 may be adjusted to a selected height when the leg support 132 is to be rotated to the storage position 134 to be most compact with the seat base 116 (e.g., positioning the connector 150 in the channel 156).

Figure 9:
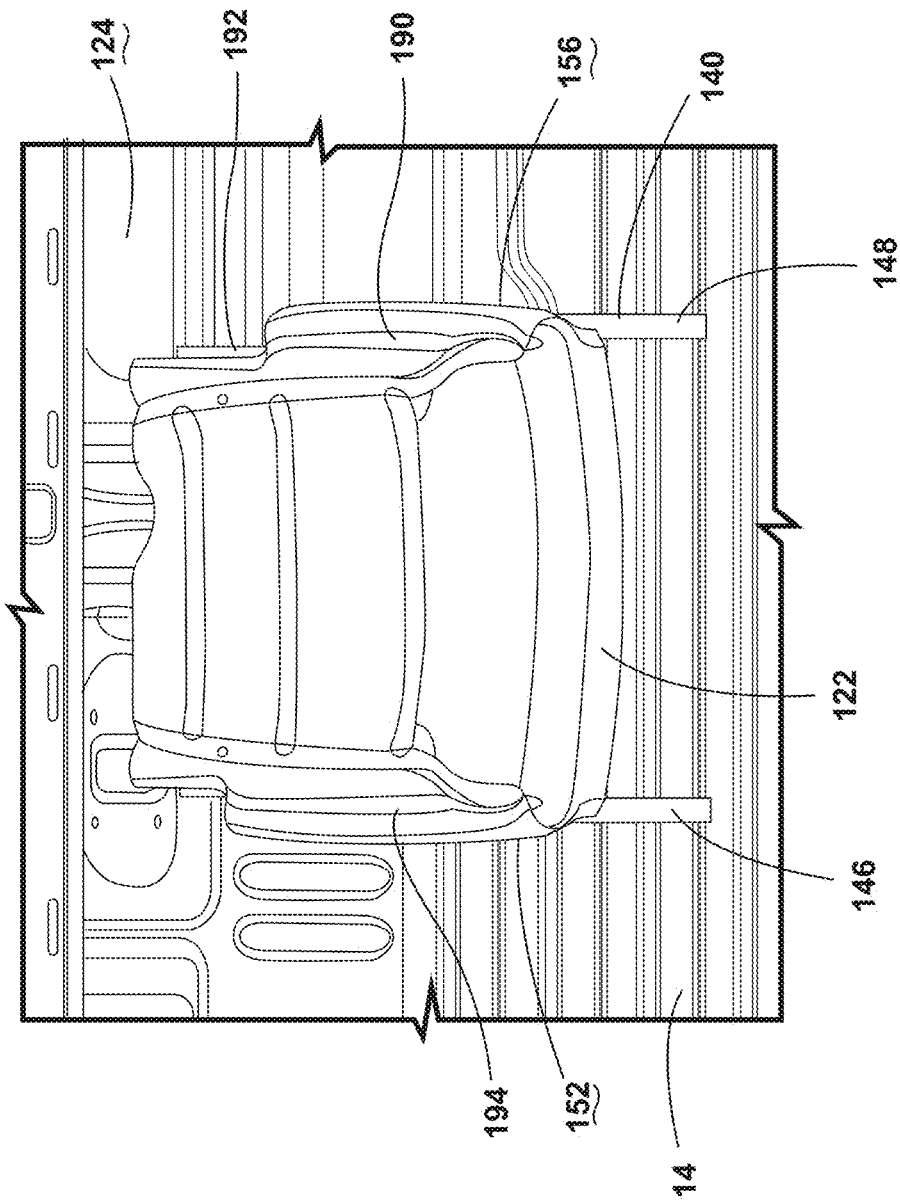
FIG. 9 is a top perspective view of a seating assembly of a vehicle seating system within a cargo space for use when the vehicle is in a stationary state, where a cushion is disposed on a seat base, according to the present disclosure.
Figure 10:
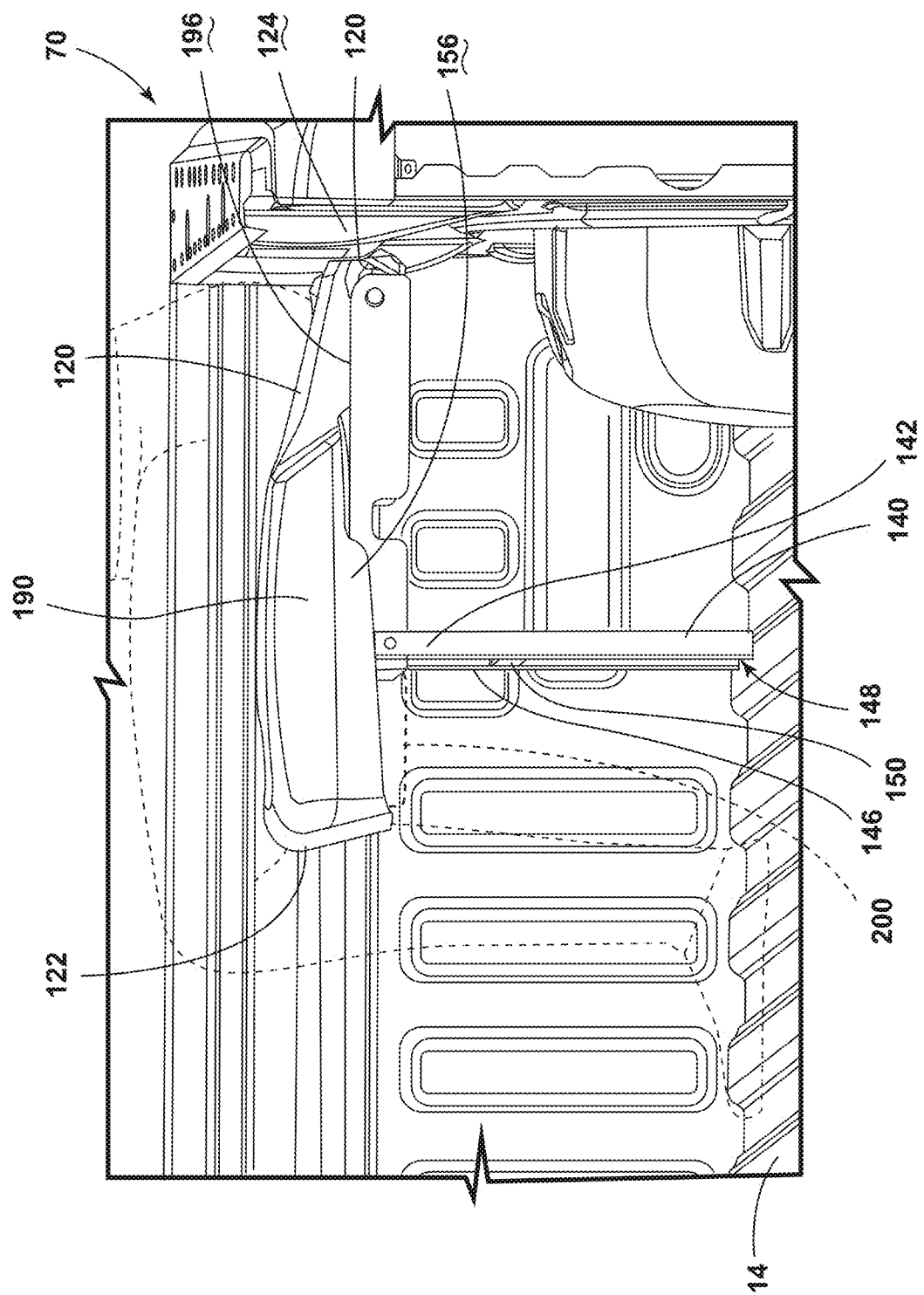
FIG. 10 is a side perspective view of a seating assembly of a vehicle seating system within a cargo space for use when the vehicle is in a stationary state, where a cushion is disposed on a seat base, according to the present disclosure.

Referring to FIGS. 9 and 10, the seating assembly 80 may include a cushion 190 selectively coupled to the seat base 116. The cushion 190 may include a center padding 192, such as a foam or other deformable material, and a cover 194. The cushion 190 is generally disposed on a support surface 196 of the seat base 116 to provide additional support and comfort for the passenger. The cover 194 is generally constructed of durable all-weather material to withstand different weather events when positioned on the exterior seating assemblies 80.

The cushion 190 is generally configured to be engaged with the seat base 116 when the seat base 116 is in either or both of the stowed position 28 and the deployed position 30. Accordingly, the cushion 190 does not substantially impinge on the rotational movement of the seat base 116 or the movement of the leg support 132. The cushion 190 may be configured to couple to the seat base 116 or elsewhere on the seating assembly 80 at one or multiple locations. For example, the cushion 190 may hook or otherwise be coupled to the proximal end 120 of the seat base 116. Additionally or alternatively, the cushion 190 may be configured to couple to the support features 104. In additional non-limiting examples, the cushion 190 may be configured to be coupled to the bottom surface 118, the side surfaces 152, 154, and/or the distal end 122 of the seat. The cushion 190 may include hooks, ties, clips, snap features, or other coupling members to engage the seating assembly 80. In various aspects, the cushion 190 and the seat base 116 may include mating or interlocking features to couple the cushion 190 to the seat base 116.

Referring still to FIGS. 9 and 10, the cushion 190 may be configured to couple to components within the passenger compartment 50 and be selectively moved between the interior seats and the exterior seating system 70. In certain aspects, the cushion 190 may be a component of or coupled to the interior seat and be configured to be removed therefrom. This configuration provides a manner for storing the cushions 190 when the cushions 190 are disengaged from the seating assemblies 80 in the cargo space 14. This configuration also allows flexibility in using the cushions 190 both within the passenger compartment 50 (FIG. 1) and the cargo space 14. As disclosed herein, currently, all modern OEMs warn occupants against sitting in the bed of a pickup truck while the vehicle 10 is moving due to safety concerns. Such OEMs may consider and/or implement lockout technology to prevent occupants from sitting in the bed of the pickup truck while the vehicle 10 is moving. However, it is anticipated that technology and the regulatory framework may evolve in the future to where such an activity is safe and permissible.

As best illustrated in FIG. 10, the cushion 190 may be larger than the seat base 116 to provide additional support or comfort for the passenger for use while the vehicle 10 is stationary or in compliance with the current OEM warnings, technology, and regulatory framework. In such examples, the cushion 190 may include internal support structures for supporting the passenger where the cushion 190 extends beyond the seat base 116. Additionally or alternatively, the seat base 116 may include an extension 200 configured to extend the size of seat base 116. The extension 200 may be configured to adjust from a first position, beneath or within the seat base 116, to a second position, at least partially extending from the seat base 116. The second position may be a side position relative to the seat base 116 (e.g., in the fore-aft direction) to widen the seat base 116 or a front position (e.g., toward the opposing sidewall 54) to lengthen the seat base 116. The extension 200 may then provide support for the larger cushion 190. The extension 200 may be advantageous for increasing the seating space provided by the seating assembly 80.

Figure 11:
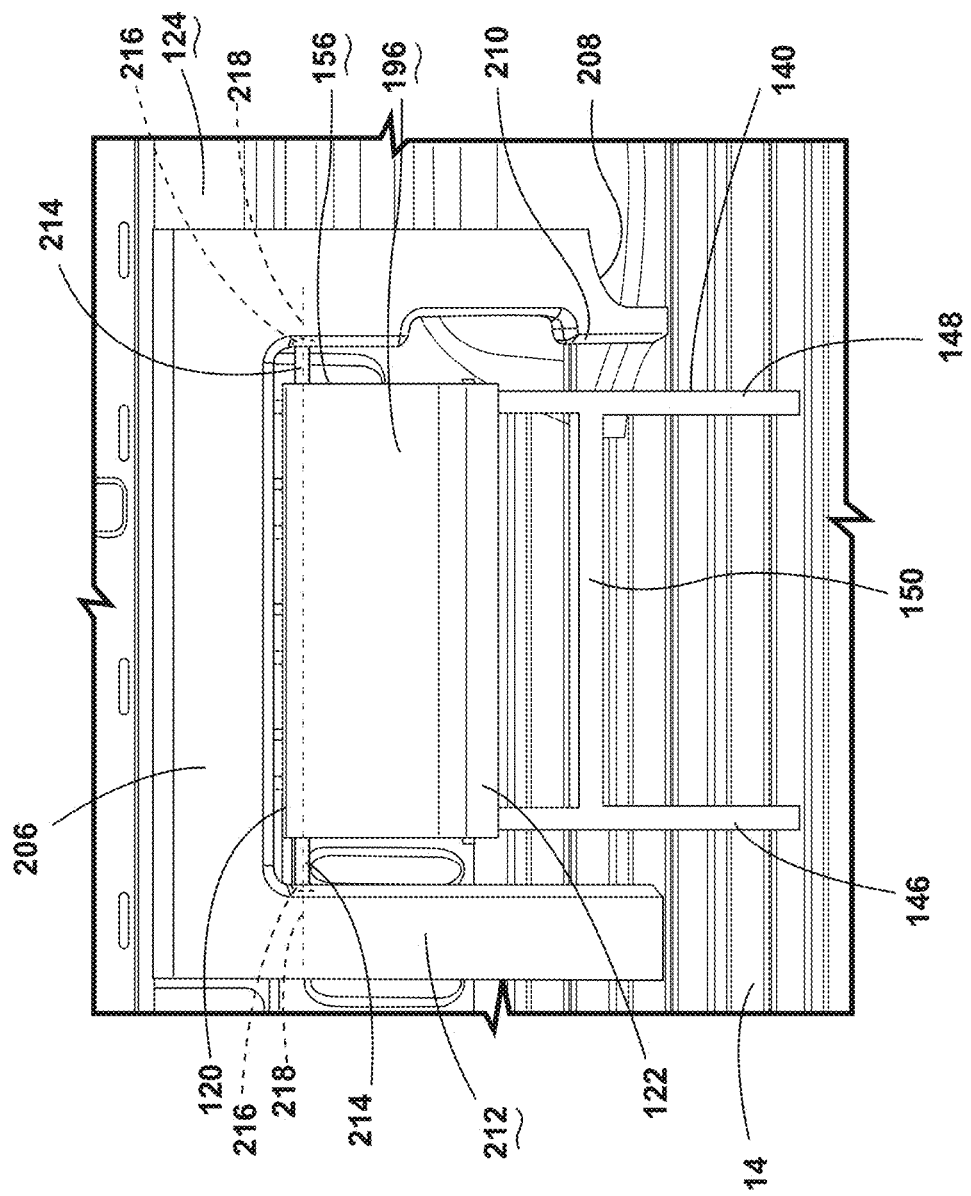
FIG. 11 is a top perspective view of a seating assembly of a vehicle seating system within a cargo space for use when the vehicle is in a stationary state, where a seat base is coupled to a frame disposed adjacent to a sidewall, according to the present disclosure.
Figure 12:
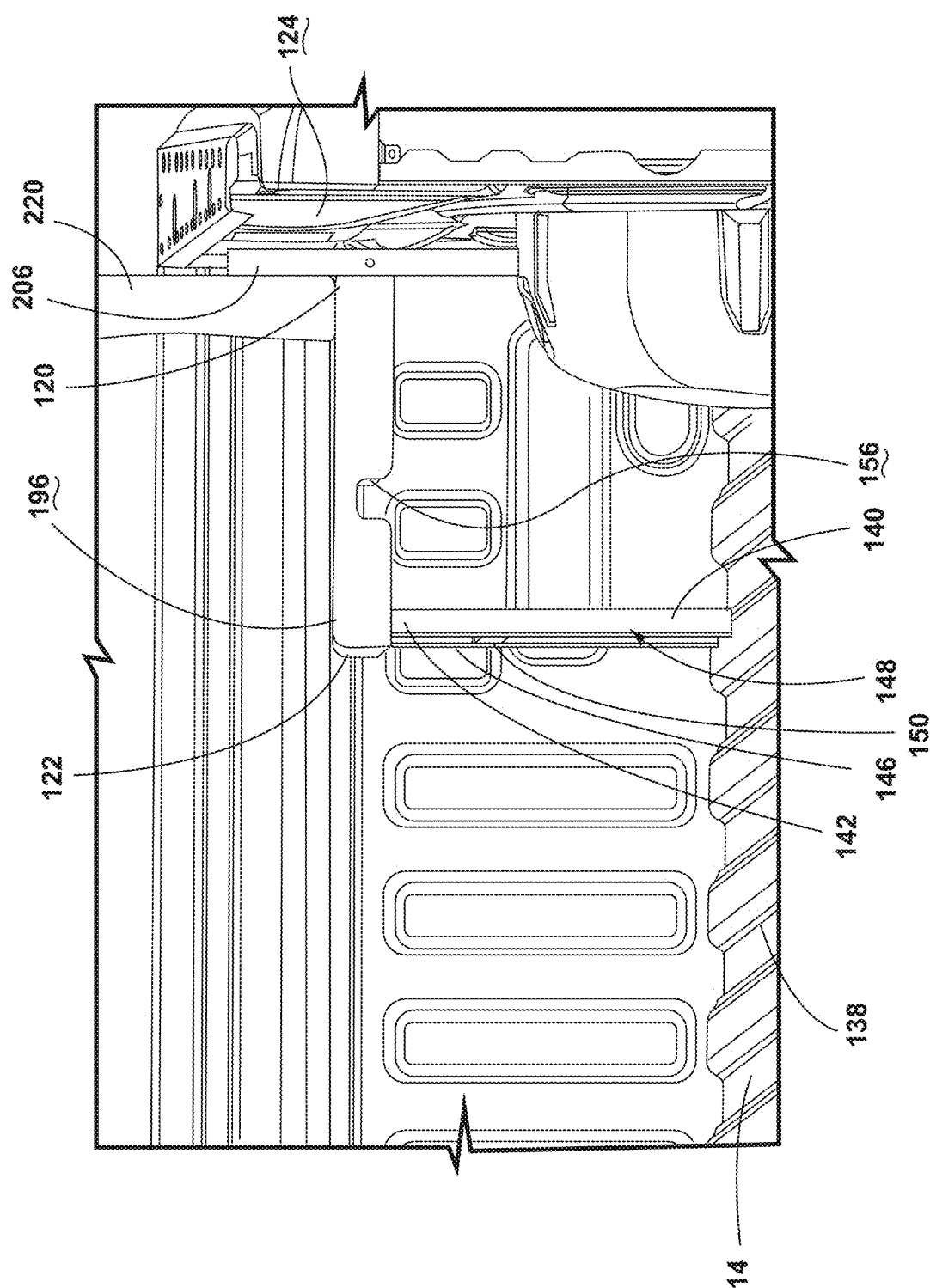
FIG. 12 a side elevation view of a seating assembly of a vehicle seating system within a cargo space for use when the vehicle is in a stationary state, where a seat base is coupled to a frame disposed adjacent to a sidewall, according to the present disclosure.

Referring to FIGS. 11 and 12, the seating system 70 may also include a frame 206 or multiple frames 206 coupled to the sidewalls 54 proximate to the seating assemblies 80. When the seat base 116 is in the stowed position 28, the seat base 116 may abut, yet protrude slightly from the inner surface 124 of the first sidewall 16. The frames 206 are configured to be disposed adjacent to the sidewalls 54 to provide more uniform side surfaces in the cargo space 14 when the seat bases 116 are in the stowed position 28.

In the example illustrated in FIGS. 11 and 12, the frame 206 abuts the sidewall 54 adjacent to the respective wheel housing 20, 22 and defines a notch 208 for receiving a portion of the wheel housing 20, 22. Additionally or alternatively, the frame 206 may be disposed adjacent to and not extend at least partially over the wheel housing 20, 22. The frame 206 defines a receiving aperture 210 configured to receive the seat base 116 when the seat base 116 is in the stowed position 28. When in the stowed position 28, the support surface 196 of the seat base 116 may generally align with a front surface 212 of the frame 206, providing a more uniform surface along the sidewall 54 adjacent to the wheel housing 20, 22. The frame 206 may be advantageous for protecting the seat base 116. Additionally, the frame 206 may assist the user with avoiding contact with the side surfaces 152, 154 of the seat bases 116 when loading, unloading, or moving items within the cargo space 14.

The seat base 116 may be coupled to the frame 206. In certain aspects, the frame 206 is coupled to the sidewall 54 and the seat base 116 is selectively coupled to the frame 206. In additional or alternative examples, the frame 206 may be included as part of the seating assembly 80, such that the seat base 116 is coupled to the frame 206. In such examples, the frame 206 is coupled to the sidewall 54 with the seat base 116 as a single unit. The frame 206 may be coupled to the support features 104 or the sidewall 54, or alternatively may be supported by the engagement between the seat base 116 and the support features 104.

In examples with the frame 206, the seat base 116 includes pivot members 214 extending in opposing directions (the fore-aft directions) from the proximal end 120 of the seat base 116. The pivot members 214 rotatably engage the frame 206, allowing the seat base 116 to rotate relative to the frame 206. The frame 206 may define apertures or recesses 216 to receive the pivot members 214. It is also contemplated that the frame 206 includes the pivot members 214 that engage apertures or recesses 216 on the seat base 116 without departing from the teachings herein. The seat base 116 is configured to rotate about a rotational axis 218 defined by the pivot members 214.

The configuration illustrated in FIG. 11 includes the frame 206 on a single side of the wheel housing 20, 22 with a single receiving aperture 210. Each seating assembly 80 may be associated with an individual frame 206, such that there can be the same number of seating assemblies 80 and frames 206. In additional or alternative examples, the seating system 70 may include two frames 206, with a single frame 206 for each sidewall. In such examples, the frames 206 each extend the length of the cargo space 14 from proximate the cabin wall 56 to proximate the tailgate 58 (FIG. 1). The frames 206 may each define the notch 208 to receive the wheel housing 20, 22, respectively, as well as one receiving aperture 210 on each side of the wheel housings 20, 22 to receive the seating assemblies 80, respectively, coupled to the same sidewall 54.

As illustrated in FIGS. 11 and 12, the leg support 132 may be coupled to the bottom surface 118 of the seat base 116. The seat base 116 may define cavities or additional channels 156 for receiving a substantial portion or all of the leg support 132 when the leg support 132 is in the storage position 134. In this configuration, the leg support 132 is generally contained within the seat base 116 when in the storage position 134, which may be advantageous for protecting corners and surfaces of the leg support 132. The leg support 132 being concealed within the seat base 116 may increase the longevity of the leg support 132, as well prevent items such as netting, string, tie down, cord, etc. from catching on the exposed leg support 132. Moreover, the user may move the seating assembly 80 by grasping the seat base 116 rather than the leg support 132. When the leg support 132 is stored in the seat base 116, the seat base 116 may be wider to cover the leg support 132. Additionally or alternatively, the leg support 132 may be narrower to fit within the seat base 116 without departing from the teachings herein.

In various examples, the seating assemblies 80 may include a seatback 220. The seatback 220 may be selectively coupled to the seat base 116, such that the seatback 220 may be removable. In such examples, the seatback 220 may couple with the seat base 116 and/or the support feature 104 via hooks, clips, supports in receiving holes, etc. Additionally or alternatively, the seatback 220, the seat base 116, and the leg portion 132 may be a single unit.

The seatback 220 may be rotatably coupled to the proximal end 120 of the seat base 116. The seatback 220 is generally operable between a storing position, abutting the seat base 116, and a supporting position, extending upwards from the seat base 116 to support the passenger. In certain aspects, the seatback 220 may rest against the support surface 196 of the seat base 116 when in the storing position. The seatback 220 may then rotate away from the support surface 196 to the supporting position for use by the passenger when the vehicle 10 is stationary and/or in compliance with the current OEM warnings, technology, and regulatory framework.

In an additional or alternative example, the seatback 220 is configured to abut the bottom surface 118 of the seat base 22 when in the storing position. In this configuration, when the seatback 220 is in the storing position, the leg support 132 is configured to extend between the seat base 116 and the seatback 220 when the leg support 132 is in the storage position 134. This configuration may assist in securing the leg support 132 in the storage position 134 and may also be configured to lock the leg support 132 in the storage position 134. The seat base 116 is configured to rotate between the stowed position 28 and the deployed position 30 without the leg support 132 or the seatback 220 moving or impinging on the movement of the seat base 116.

The leg support 132 may be coupled to the bottom surface 118 and stored within the seating assembly 80 when the leg support 132 is in the storage position 134. This may provide a compact storage arrangement for the leg support 132, concealing the leg support 132 within the seating assembly 80. It is also contemplated that the leg support 132 may be coupled to the side surfaces 152, 154 of the seat base 116 without departing from the teachings herein.

Referring still to FIGS. 11 and 12, the seatback 220 may be able to rotate to the storing position abutting the support surface 196 and the storing position, abutting the bottom surface 118 of the seat base 116. This may provide increased flexibility and arrangements for the seating system 70. For example, the storing position with the seatback 220 abutting the bottom surface 118 may also allow the passenger to utilize the seating assembly 80 without the seatback 220. In such examples, the seatback 220 may be rotated away from the seat base 116 to move the leg support 132 from the storage position 134 to the support position 136, and then the seatback 220 may be moved back to the storing position.

The seatback 220 is generally configured to rotate in a range between about 90 degrees and about 270 degrees. It is also contemplated that the seatback 220 may rotate about 360 degrees to rest on the support surface 196 and abut the bottom surface 118 of the seat base 116 without departing from the teachings herein. At least one of the seatback 220 and the seat base 116 may include at least one retaining member to retain the seatback 220 in the storing position and/or the supporting position. Further, the seatback 220 may rest against the sidewall 54 for support when in the supporting position for use when the vehicle 10 is stationary and/or in compliance with the current OEM warnings, technology, and regulatory framework.

The seatback 220 may be rotated to the supporting position prior to the seating assembly 80 being coupled to the sidewall 54. Additionally or alternatively, the seatback 220 may be configured to rotate or move to the supporting position when the seat base 116 is coupled to the sidewall 54. In such examples where the seatback 220 is abutting the bottom surface 118 in the storing position, a rotational path of the seatback 220 may move around the support feature 106 and the sidewall 54. For example, the seatback 220 may be coupled to the seat base 116 proximate one of the side surfaces 154 and rotate sideways around the side surface 154 to be disposed proximate to the support surface 196 of the seat base 116. In this way, the seatback 220 may rotate along a plane generally parallel to the sidewall 54. The seatback 220 may also include a latch to secure the seatback 220 to the seat base 116 once the seatback 220 has been moved to the supporting position.

The seatback 220 may have any practicable configuration. The seatback 220 may be a flexible material, such as fabric, for supporting the passenger. Additionally or alternatively the seatback 220 may include a cushion or may have a cushion coupled thereto.

Referring still to FIGS. 11 and 12, the seatback 220 and the seat base 116 may be configured to form a cavity when the seatback 220 is in the storing position. For example, the cavity may be defined at least partially by the bottom surface 118 of the seat base 116. The leg support 132 may be disposed within the cavity when in the storage position 134. Additionally, the cavity may be utilized for storing items. In this way, the seatback 220 is configured to operate as a lid that mates with the seat base 116 to form a box-like storage feature. The box-like storage feature may provide for flat storage of the seating assembly 80 while providing additional storage space.

Referring to FIGS. 1-12, the seating system 70 may provide for multiple seating arrangements within the cargo space 14 of the vehicle 10. All modern OEMs of passenger vehicles 10 currently warn occupants against sitting in the bed of a pickup truck while the vehicle 10 is moving due to safety concerns. However, it is anticipated that technology and the regulatory framework may evolve in the future to where such an activity is safe and permissible. In the illustrated example, the seating system 70 includes four seating assemblies 80, with two seating assemblies 24, 26 coupled to the first sidewall 16 on opposing sides of the first wheel housing 20 and two additional seating assemblies 76, 78 coupled to the second sidewall 18 on opposing sides of the second wheel housing 22. Additional or fewer seating assemblies 80 may be included in the seating system 70 without departing from the teachings herein.

The seating assemblies 80 may remain engaged with the respective sidewall 54 or removably coupled with the sidewalls 54. In examples where the seating assemblies 80 are removably coupled with the sidewalls 54, the seat seating assemblies 80 may selectively engage the support features 104 or may be included in the same unit as the support feature 104, which is configured to engage the mounting brackets 100 on the sidewalls 54. The mounting brackets 100 provide a uniform mounting point in the cargo space 14, which supports various accessories, including the seating system 70. Accordingly, seating assemblies 80 may be added or removed from the cargo space 14 based on the selected arrangement for the user. One or more of the seating assemblies 80 may be coupled with the frame 206, include the cushion 190, include the seatback 220. Moreover, one or more of the seating assemblies 80 may include the leg support 132 that extends proximate to the side surfaces 154, 156 of the seat base 116 when in the storage position 134, as best illustrated in FIGS. 4-10, or the leg support 30 that extends into or inside of the seat base 116 when in the storage position 134, as best illustrated in FIGS. 11-12. The different positions of the leg support 132 may each be utilized with the cushion 190, the frame 206, and/or the seatback 220.

Figure 14:
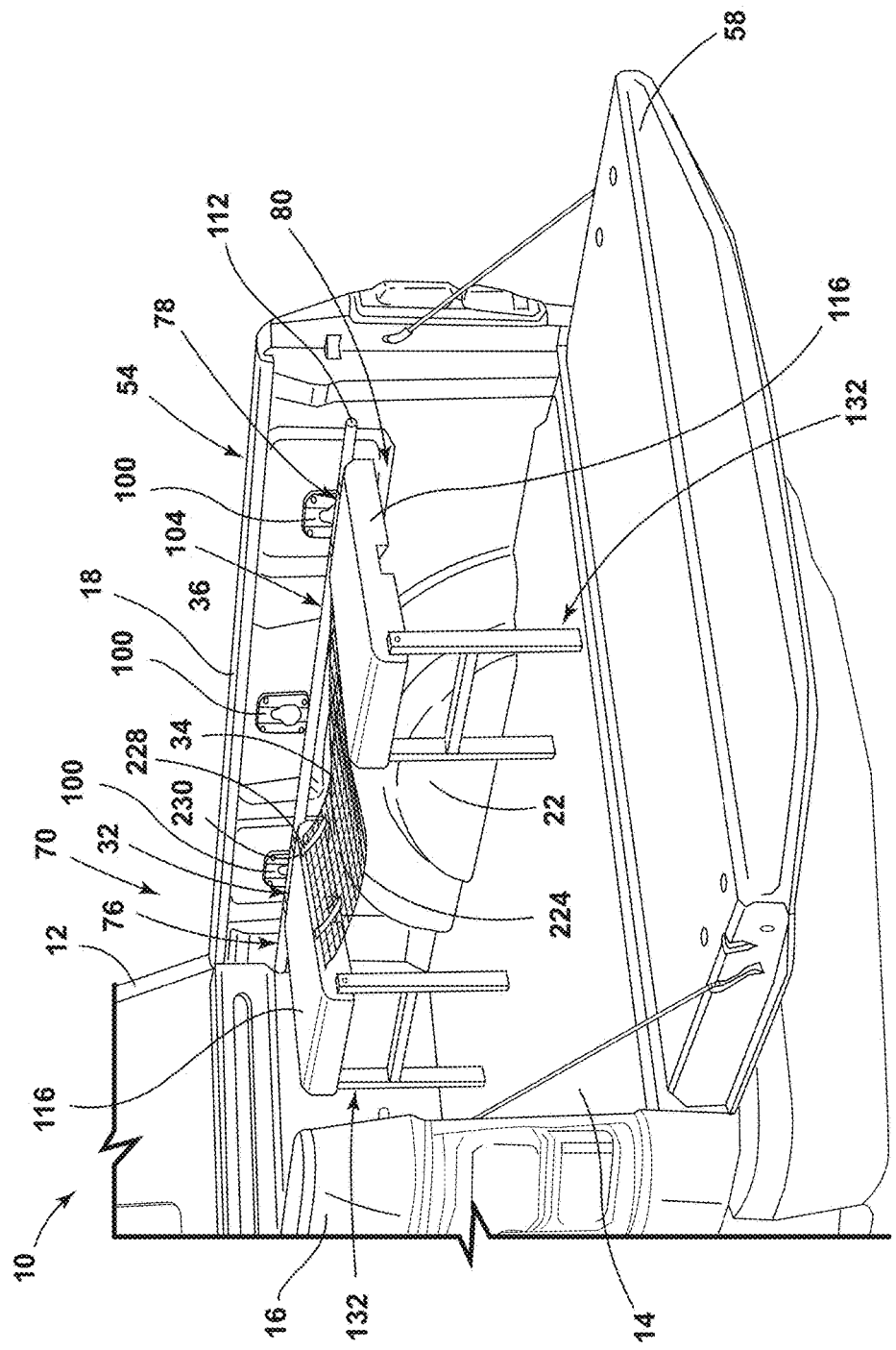
FIG. 14 is a side perspective view of a seating system in a cargo space of a vehicle for use when the vehicle is in a stationary state with seating assemblies in deployed positions and a bench seat extending between the adjacent seating assemblies in an adjacent support position, according to the present disclosure.
Figure 15:
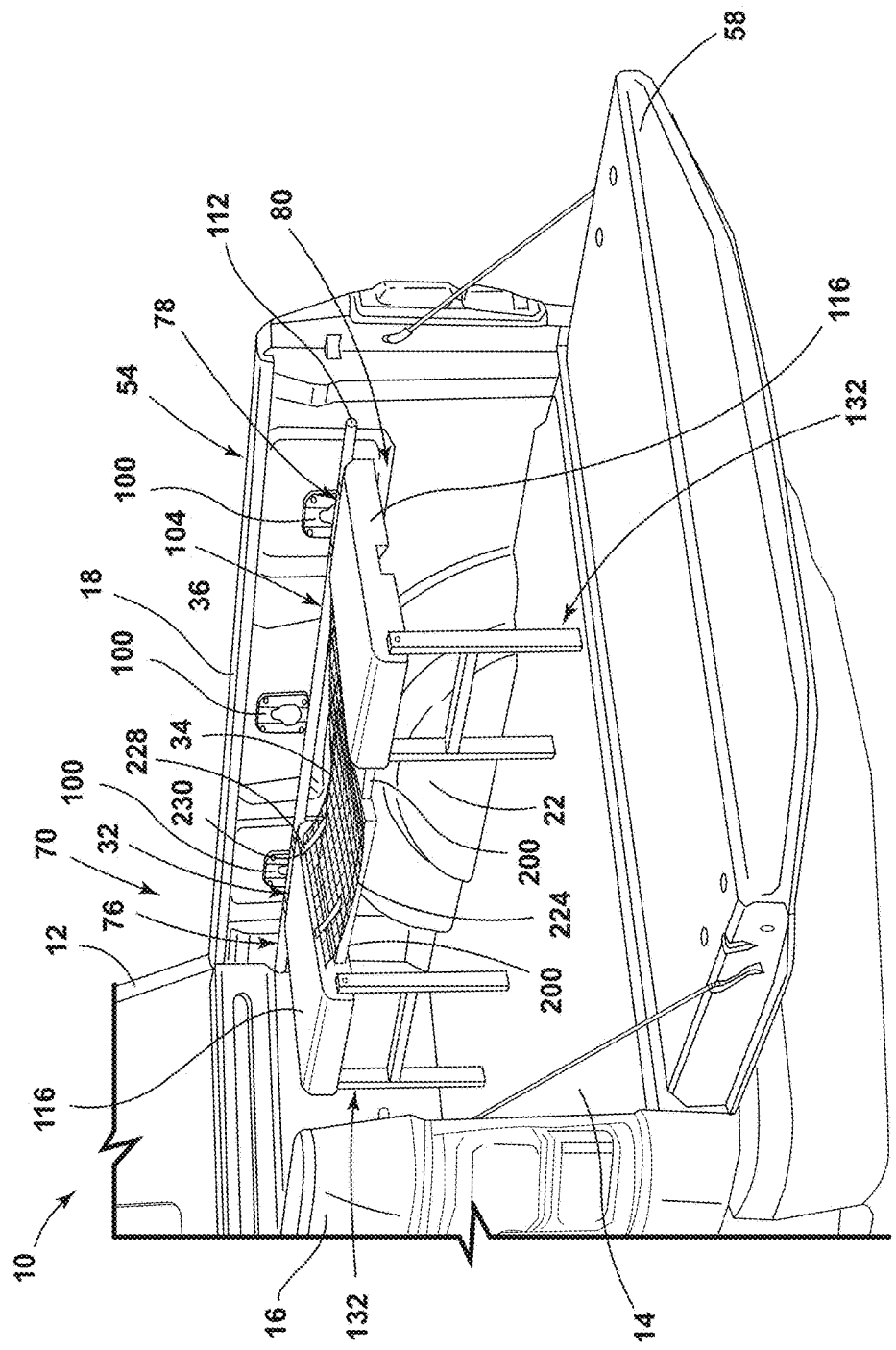
FIG. 15 is a side perspective view of a seating system in a cargo space of a vehicle for use when the vehicle is in a stationary state with seating assemblies in deployed positions and a bench seat extending between the adjacent seating assemblies in an adjacent support position and resting on extensions of the seating assemblies, according to the present disclosure.

Referring to FIGS. 13 and 14, the seating system 70 may include the supplementary support member 32, such as the bench seat 34 for use when the vehicle 10 is stationary and/or in compliance with the current OEM warnings, technology, and regulatory framework. The bench seat 34 provides additional seating arrangements and flexibility for the seating system 70. While all modern OEMs currently warn occupants against sitting in the bed of the pickup truck while the vehicle 10 is moving, it is anticipated that technology and the regulatory framework may evolve in the future to where such an activity is safe and permissible. The bench seat 34 is operable between a stored position 222, as illustrated in FIG. 13, and an extended position 224, as illustrated in FIG. 14. Generally, when in the extended position 224, the bench seat 34 provides at least one supplemental seating space for the seating system 70 within the cargo space 14 for use when the vehicle 10 is stationary. When in the extended position 224, the bench seat 34 is selectively adjustable or positionable between the adjacent support position 36 and the cross support position 38, providing increased flexibility in the exterior seating arrangements for the seating system 70.

The bench seat 34 is typically constructed of a flexible material, which may have some elasticity. The retracted position 172 of the bench seat 34 is generally a rolled or folded condition where the bench seat 34 may be stored, for example, in a storage feature 226 in the passenger compartment 50 or coupled to another component of the seating system 70. In certain aspects, the storage feature 226 may be an extension 200 of the bench seat 34 and may be coupled to at least one of the seating assemblies 80, such as the illustrated second seating assembly 26. In such examples, the storage feature 226 may be coupled to the side surface 154 of the seat base 116 proximate to the wheel housing 20 and may be configured to store the bench seat 34 in the retracted position 172. The stowed bench seat 34 may be configured to not substantially impinge on the movement of the seating assembly 80 between the stowed and deployed positions 28, 30 or the leg support 132 between the storage and supporting positions 134, 136.

The bench seat 34 is configured to unroll or unfold to the extended position 224, as illustrated in FIG. 14, to provide the additional seating space or spaces. Currently, all modern OEMs warn against sitting in the bed of the pickup truck while the vehicle 10 is moving; however, it is anticipated that technology and the regulatory framework may evolve in the future to where such an activity is safe and permissible. The bench seat 34 may be utilized while the vehicle 10 is stationary and/or in compliance with the current OEM warnings, technology, and regulatory framework. When in the adjacent support position 36, the bench seat 34 is configured to extend between and engage two adjacent seating assemblies 80 coupled to the same sidewall 54, such as the first seating assembly 24 and the second seating assembly 26. The bench seat 34 may also extend between the third seating assembly 76 and the fourth seating assembly 78 in a similar manner as described herein without departing from the teachings herein.

In the illustrated configuration in FIG. 14, the bench seat 34 is configured to extend over the first wheel housing 20 and provides an additional seating space between the first and second seating assemblies 24, 26 when the vehicle 10 is stationary. In various aspects, the bench seat 34 may be configured to extend between the side surface 152 of the first seating assembly 24 and the side surface 154 of second seating assembly 26, which are disposed proximate to the wheel housing 20, 22. The seating assemblies 80 each have a first coupling member 228 while opposing ends of the bench seat 34 each have a second coupling member 230 configured to engage the first coupling members 228 on the seating assemblies 80. In certain aspects, the first and second coupling members 228, 230 may be first and second zipper portions such that the bench seat 34 is configured to zip to the seating assemblies 80. In additional or alternative configurations, the first and/or second coupling members 228, 230 may be hooks, loops, clips, snap features, carabineers, zippers, or other features configured to engage one another.

It is also contemplated that the bench seat 34 may engage alternative or additional areas of the seating assembly 80. For example, the bench seat 34 may extend across one or both of the seat bases 116 of the adjacent seating assemblies 80 to engage the outside side surfaces 152, 154 (e.g., away from the wheel housing 20). In this way, the passengers seated on the seat bases 116 may assist in retaining the bench seat 34 in position. The cushions 190 may also be disposed over the bench seat 34, such that the bench seat 34 extends between the cushions 190 and the seat bases 116. Additionally or alternatively, the bench seat 34 may be coupled to the bottom surface 118 of the seat base 116, the leg supports 132, or the support features 104.

Referring still to FIGS. 13 and 14, in various examples, the sidewall 54 may have at least three mounting brackets 100 configured to couple with one or more support features 104. The mounting brackets 100 may be spaced along the sidewall 54, with one on each side of the wheel housing 20, 22 and one above the wheel housing 20, 22. In such examples, each of the seating assemblies 80 may be coupled to separate support features 104 coupled with the individual mounting brackets 100. Additionally or alternatively, the support features 104 may include the support beam 112 that has multiple mounting portions 106 configured to engage multiple mounting brackets 100.

In the example illustrated in FIG. 14, the support beam 112 has two mounting portions 106 configured to engage the two mounting brackets 100 on opposing sides of the wheel housing 22. Both of the seating assemblies 80 and the bench seat 34 may be coupled to the support beam 112. A side of the bench seat 34 may include the coupling member 230 for engaging the support beam 112 or a coupling feature on the support beam 112, which may be advantageous for providing additional support to the bench seat 34 and may also form a portion of a seatback for the bench seat 34.

In various examples, as illustrated in FIG. 14, the bench seat 34 may also be supported by the extension 200 from one or both of the adjacent seating assemblies 80. The extension 200 may be disposed at least partially over the wheel housing 20, with the bench seat 34 resting on the extension 200. It is also contemplated that the bench seat 34 may rest on the wheel housing 20 for support or may be suspended above the wheel housing 20 without resting on any surface between the first and second seating assemblies 24, 26.

Figure 16:
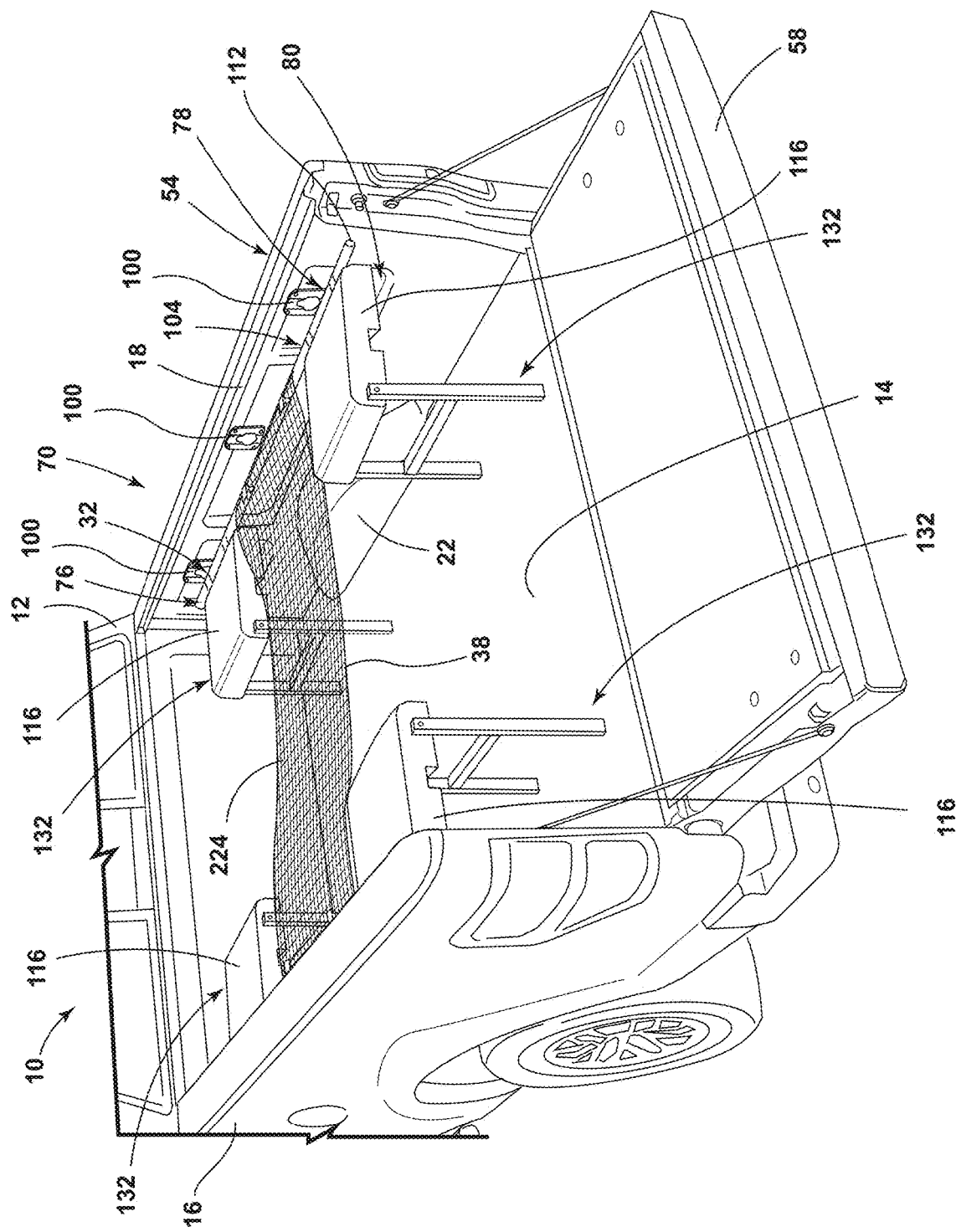
FIG. 16 is a side perspective view of a seating system in a cargo space of a vehicle for use when the vehicle is in a stationary state with seating assemblies in deployed positions and a bench seat extending between opposing sidewalls in a cross support position, according to the present disclosure.

Referring to FIG. 16, the bench seat 34 is also selectively positionable in the cross support position 38. In the cross support position 38, the bench seat 34 extends across the cargo space 14 between the first and second sidewalls 16, 18. The coupling members 230 on the ends of the bench seat 34 engage the support beam 112 or the support features 104 on each sidewall 16, 18. In the illustrated configuration, the bench seat 34 is configured to extend from the first sidewall 16 over the first wheel housing 20 to the second sidewall 18 over the second wheel housing 22. Accordingly, the bench seat 34 extends from the first sidewall 16 between the first and second seating assemblies 24, 26 to the second sidewall 18 between the second the third and fourth seating assemblies 76, 78. As noted herein, all modern OEMs of passenger vehicles 10 currently warn occupants against sitting in the bed of a pickup truck while the vehicle 10 is moving due to safety concerns. OEMs may consider and/or implement lockout technology to prevent such an activity. It is anticipated that technology and the regulatory framework may evolve in the future to where such an activity is safe and permissible. Accordingly, the seating system 70, including the bench seat 34, may be utilized in accordance with the current OEM warnings, technology, and regulatory framework.

Further, the bench seat 34 may also be coupled to the seating assemblies 80 when in the cross support position 38. Sides of the bench seat 34 proximate the end coupled to the first sidewall 16 may be coupled to one or both of the first and second seating assemblies 24, 26, while the sides of the bench seat 34 at the opposing end may be coupled to one or both of the third and fourth seating assemblies 76, 78. Accordingly, the sides of the bench seat 34 may include the coupling member 230 to engage the coupling members 228 on the seating assemblies 80. The engagement with the seating assemblies 80 may provide additional support and stability to the bench seat 34 in the cross support position 38.

The seating assemblies 80 may be selectively engageable with the sidewalls 54. The seating assemblies 80 may not be coupled to the sidewall 54, in which case the bench seat 34 may extend between any location on the support beam 112 on the first sidewall 16 to any location on the support beam 112 on the second sidewall 18, providing increased flexibility for the seating system 70 for use when the vehicle 10 is stationary and/or in compliance with the current OEM warnings, technology, and regulatory framework. For example, the bench seat 34 may replace the second and fourth seating assemblies 26, 78 proximate to the cabin wall 56. The bench seat 34 may also extend between two opposing seating assemblies 80 (e.g. the first and third seating assemblies 26, 76) to provide another arrangement of the exterior seating of the vehicle 10. In such examples, the bench seat 34 may be coupled to the seat bases 116, the leg support 132, and/or the support features 104.

When in the cross support position 38, the bench seat 34 may provide one or more seating space and or may be utilized as a canopy or hammock seating when the vehicle 10 is stationary. The bench seat 34 may be a length sufficient to be arranged in the various positions within the cargo space 14. The manner in which the bench seat 34 couples to other components of the seating system 70 may depend on the dimensions of the bench seat 34.

Figure 17:
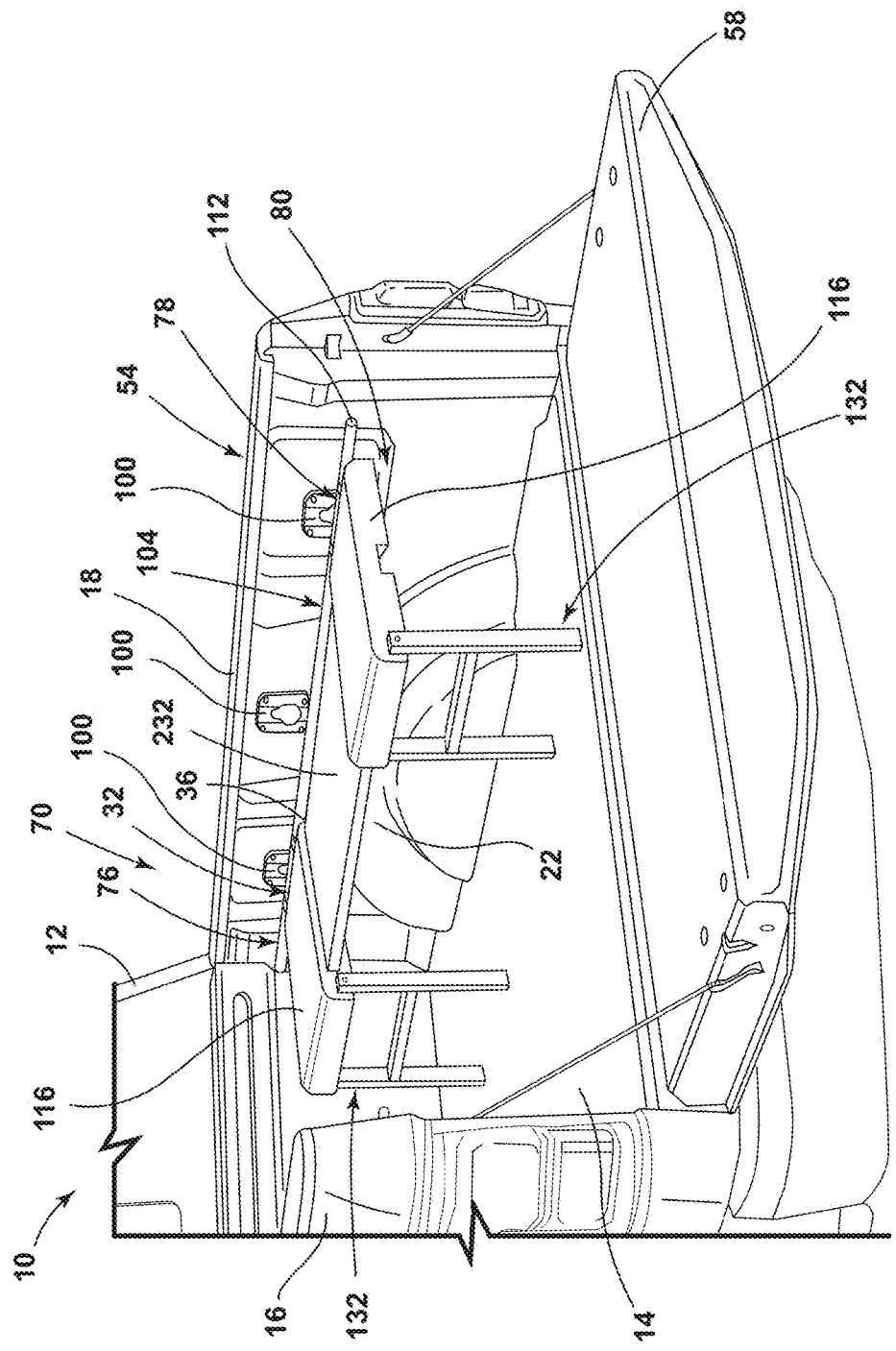
FIG. 17 is a side perspective view of a seating system in a cargo space of a vehicle for use when the vehicle is in a stationary state with seating assemblies in deployed positions and a table feature extending between the adjacent seating assemblies in a cross support position, according to the present disclosure.

Referring to FIG. 17, the supplementary support member 32 may additionally or alternatively be configured as a table feature 232. The table feature 232 may provide seating spaces, but may also provide a table surface for supporting or holding various items for use when the vehicle 10 is stationary and/or in compliance with the current OEM warnings, technology, and regulatory framework. The table feature 232 is selectively positionable in the adjacent support position 36, as well as the cross support position 38 in a similar manner as the bench seat 34 described herein. In such examples, the table feature 232 may extend between the adjacent seating assemblies 80 on the same sidewall 54 or between opposing sidewalls 54 to provide different locations and arrangements for providing the table surface. The table feature 232 may be a single panel, or alternatively multiple panels that may be configured to fold into the stored position 222 and unfold into the extended position 224. The table feature 232 may be constructed of a rigid material to support various items. The table feature 232 may be advantageous for providing a support surface for holding items for those passengers utilizing the seating system 70 in the cargo space 14 when the vehicle 10 is stationary.

Additionally, in examples where the seating assemblies 80 include the extension 200. The extension 200 may be a substantially rigid component that can also operate as a table surface. In such examples, multiple levels of table surfaces or an increased number of table surfaces may be available to the passengers using the seating system 70.

The seating system 70 is illustrated in the bed of the pickup truck. The seating system 70 may be used in compliance with the current OEM warnings, technology, and regulatory framework. While, all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible. OEMs that warn against such an activity may consider and/or implement lockout mechanisms to prevent such an activity.

Use of the present device or system may provide for a variety of advantages. For example, the seating system 70 may provide additional seating options within the cargo space 14 of the vehicle 10 for use when the vehicle 10 is stationary and/or in compliance with the current OEM warnings, technology, and regulatory framework. The additional seating options may be exterior seating options, for example, in the truck bed. Additionally, the seating system 70 may include one or more of the seating assemblies, cushions 190, and the frames 206. Further, the seating system 70 provides flexible seating options with multiple arrangements possible with the various components. Also, the seating assemblies may be selectively added and removed from the cargo space 14 or may be retained in the cargo space 14 of the seating system 70. Moreover, the seating assemblies are operable between the stowed position 28 and the deployed position 30 for continued use of the seating system 70 over time without removing the seating assemblies after each use. Additionally, when the seating assemblies are in the stowed position 28, the seating assemblies are compact and abut the sidewalls 54 to maximize the storage area within the cargo space 14. Further, the seating system 70 utilizes the mounting brackets 100, which provides increased flexibility for the cargo space 14 as the mounting brackets 100 may be universal or common mounting points within the cargo space 14.

Also, the supplementary support member 32 may be configured as the bench seat 34 to provide additional seating spaces within the cargo space 14 between the adjacent seating assemblies 80 on the same sidewall 54 or between the sidewalls 54. Additionally, the supplementary support member 32 may be configured as the table feature 232 to provide the table surface for those sitting on the seating assemblies 80 of the seating system 70. The seating system 70 provides a multitude of the seating arrangements based on a selected configuration of the users.

Further, the supplementary support member 32 is operable between the storage position 134 and the extended position 224 to increase flexibility in the arrangements of the seating system 70. Additional benefits or advantages may be realized and/or achieved.

According to various examples, a vehicle includes a body defining a cargo space. The body includes a first sidewall and a second sidewall that at least partially define the cargo space. The first sidewall defines a first wheel housing, and the second sidewall defines a second wheel housing. A first seating assembly is coupled to the first sidewall on a first side of the first wheel housing. A second seating assembly is coupled to the first sidewall on a second side of the first wheel housing. The first seating assembly and the second seating assembly are each operable between a stowed position, abutting the first sidewall, and a deployed position, extending from the first sidewall. A bench seat is configured to selectively couple to each of the first seating assembly and the second seating assembly in an adjacent support position and each of the first sidewall and the second sidewall in a cross support position. Embodiments of the present disclosure may include one or a combination of the following features:

the bench seat is operable between a retracted position for storage and an extended position for providing a seating space;

the bench seat is configured to extend over the first wheel housing when in the adjacent support position to define the seating space between the first seating assembly and the second seating assembly;

a third seating assembly coupled to the second sidewall on a first side of the second wheel housing;

a fourth seating assembly coupled to the second sidewall on a second side of the second wheel housing;

a first support feature coupled to the first sidewall;

a second support feature coupled to the second sidewall;

the bench seat is configured to selectively couple to the first support feature between the first seating assembly and the second seating assembly and the second support feature between the third seating assembly and the fourth seating assembly in a cross support position to extend across the cargo space;

wherein the bench seat is constructed of a flexible material;

the bench seat is configured to selectively couple to the first sidewall adjacent to the first wheel housing and the second sidewall adjacent to the second wheel housing in the cross support position to extend across the cargo space;

mounting brackets coupled to the first sidewall;

a support beam is coupled to each of the mounting brackets; and the first seating assembly and the second seating assembly are coupled to the support beam.

According to various examples, a seating system for a vehicle includes a first sidewall and a second sidewall. A second sidewall opposes the first sidewall. The first sidewall and the second sidewall at least partially define a cargo space. A first seating assembly is coupled to the first sidewall. A second seating assembly is coupled to the first sidewall. A bench seat is configured to be selectively adjustable between an adjacent support position and a cross support position. The bench seat is coupled to the first seating assembly and the second seating assembly when in the adjacent support position. The bench seat is coupled to the first sidewall and the second sidewall in the cross support position. Embodiments of the present disclosure may include one or a combination of the following features:
  wherein the cargo space is a truck bed;
  each of the first seating assembly and the second seating assembly includes: a seat base rotatable between a stowed position and a deployed position;
  a leg support rotatable to the seat base, wherein the leg support is operable between a storage position and a supporting position;
  a first support feature coupled to the first sidewall proximate to a first wheel housing; and
  a second support feature coupled to the second sidewall proximate to a second wheel housing, wherein the bench seat extends from the first support feature to the second support feature when in the cross support position;
  the bench seat is coupled to at least one of the first seating assembly and the second seating assembly when in the cross support position;
  a support beam coupled to the first sidewall;
  each of the first seating assembly and the second seating assembly are coupled to the support beam;
  a frame coupled to the first sidewall; and
  the frame defines a receiving aperture configured to receive the first seating assembly when the first seating assembly is in the stowed position.

According to various examples, a vehicle seating system includes a first sidewall at least partially defining a cargo space. The first sidewall defines a wheel housing. A first seating assembly is coupled to the first sidewall on a first side of the wheel housing. A second seating assembly is coupled to the first sidewall on a second side of the wheel housing. Each of the first seating assembly and the second seating assembly includes a seat base operable between a stowed position and a deployed position. A bottom surface of the seat base is disposed adjacent to the first sidewall when in the stowed position. Each of the first seating assembly and the second seating assembly also includes a leg support operably coupled to the seat base. The leg support is operable between a storage position and a supporting position. A bench seat is coupled to the first seating assembly and the second seating assembly when in an adjacent support position to define a seating space over the wheel housing between the first seating assembly and the second seating assembly. Embodiments of the present disclosure may include one or a combination of the following features:
  a second sidewall opposing the first sidewall;
  the bench seat is coupled to the first sidewall adjacent to the wheel housing and the second sidewall when in a cross support position;
  a third seating assembly coupled to the second sidewall;
  a fourth seating assembly coupled to the second sidewall;
  the bench seat is coupled to the first sidewall between the first seating assembly and the second seating assembly and coupled to the second sidewall between the third seating assembly and the fourth seating assembly when in the cross support position;
  the bench seat is operable between a stored position and a use position;
  the bench seat is rolled in the stored position and extended when in the use position; and
  an end of the leg support is disposed adjacent to the seat base when in the storage position and configured to engage a floor of the cargo space when in the supporting position.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
  a body defining a cargo space, wherein the body includes a first sidewall and a second sidewall that at least partially define the cargo space, and wherein the first sidewall defines a first wheel housing and the second sidewall defines a second wheel housing;
  a first seating assembly coupled to the first sidewall on a first side of the first wheel housing;

a second seating assembly coupled to the first sidewall on a second side of the first wheel housing, wherein the first seating assembly and the second seating assembly are each operable between a stowed position abutting the first sidewall and a deployed position extending from the first sidewall; and a bench seat configured to selectively couple to each of the first seating assembly and the second seating assembly in an adjacent support position and operably coupled to each of the first sidewall and the second sidewall in a cross support position, wherein the bench seat includes a first zipper portion and the first seating assembly includes a second zipper portion, and wherein the first zipper portion selectively engages the second zipper portion to couple the bench seat to the first seating assembly.

2. The vehicle of claim 1, wherein the bench seat is operable between a retracted position for storage and an extended position for providing a seating space, wherein the bench seat is configured to extend over the first wheel housing when in the adjacent support position to define the seating space between the first seating assembly and the second seating assembly.

3. The vehicle of claim 1, further comprising:
a third seating assembly coupled to the second sidewall on a first side of the second wheel housing; and
a fourth seating assembly coupled to the second sidewall on a second side of the second wheel housing.

4. The vehicle of claim 3, further comprising:
a first support feature coupled to the first sidewall; and
a second support feature coupled to the second sidewall, wherein the bench seat is configured to selectively couple to the first support feature between the first seating assembly and the second seating assembly and the second support feature between the third seating assembly and the fourth seating assembly in the cross support position to extend across the cargo space.

5. The vehicle of claim 1, wherein the bench seat is constructed of a flexible material.

6. The vehicle of claim 1, wherein the bench seat is configured to selectively couple to the first sidewall adjacent to the first wheel housing and the second sidewall adjacent to the second wheel housing in the cross support position to extend across the cargo space.

7. The vehicle of claim 1, further comprising:
mounting brackets coupled to the first sidewall, wherein a support beam is coupled to each of the mounting brackets, and wherein the first seating assembly and the second seating assembly are coupled to the support beam.

8. A seating system for a vehicle, comprising:
a first sidewall;
a second sidewall opposing the first sidewall, wherein the first sidewall and the second sidewall at least partially define a cargo space;
a first seating assembly coupled to the first sidewall;
a second seating assembly coupled to the first sidewall;
a bench seat configured to be selectively adjustable between an adjacent support position and a cross support position, wherein the bench seat is coupled to the first seating assembly and the second seating assembly when in the adjacent support position, and wherein the bench seat is operably coupled to the first sidewall and the second sidewall in the cross support position;
a first support feature coupled to the first sidewall proximate to a first wheel housing; and a second support feature coupled to the second sidewall proximate to a second wheel housing, wherein the bench seat extends from the first support feature to the second support feature when in the cross support position, and wherein the bench seat is coupled to at least one of the first seating assembly and the second seating assembly when in the cross support position.

9. The seating system of claim 8, wherein the cargo space is a truck bed.

10. The seating system of claim 8, wherein each of the first seating assembly and the second seating assembly includes:
a seat base rotatable between a stowed position and a deployed position; and
a leg support rotatable to the seat base, wherein the leg support is operable between a storage position and a supporting position.

11. The seating system of claim 8, further comprising:
a support beam coupled to the first sidewall, wherein each of the first seating assembly and the second seating assembly are coupled to the support beam.

12. The seating system of claim 8, further comprising:
a frame coupled to the first sidewall, wherein the frame defines a receiving aperture configured to receive the first seating assembly when the first seating assembly is in a stowed position.

13. A vehicle seating system, comprising:
a first sidewall at least partially defining a cargo space, wherein the first sidewall defines a wheel housing and includes mounting brackets;
a first support beam coupled to the mounting brackets;
a second sidewall opposing the first sidewall;
a first seating assembly coupled to the first support beam on a first side of the wheel housing;
a second seating assembly coupled to the first support beam on a second side of the wheel housing, wherein each of the first seating assembly and the second seating assembly includes:
a seat base operable between a stowed position and a deployed position, wherein a bottom surface of the seat base is disposed adjacent to the first sidewall when in the stowed position; and
a leg support operably coupled to the seat base, wherein the leg support is operable between a storage position and a supporting position; and
a bench seat coupled to the first seating assembly and the second seating assembly when in an adjacent support position to define a seating space over the wheel housing between the first seating assembly and the second seating assembly, and wherein the bench seat extends between the first and second sidewalls in a cross support position, a side of the bench seat engaging the first support beam between the first and second seating assemblies when in the cross support position.

14. The vehicle seating system of claim 13, further comprising:
a third seating assembly coupled to the second sidewall; and
a fourth seating assembly coupled to the second sidewall, wherein the bench seat is coupled to the first sidewall between the first seating assembly and the second seating assembly and coupled to the second sidewall between the third seating assembly and the fourth seating assembly when in the cross support position.

15. The vehicle seating system of claim 13, wherein the bench seat is operable between a stored position and a use position, wherein the bench seat is rolled in the stored position and extended when in the use position.

16. The vehicle seating system of claim 13, wherein an end of the leg support is disposed adjacent to the seat base when in the storage position and configured to engage a floor of the cargo space when in the supporting position.

17. The vehicle seating system of claim 14, further comprising:
a second support beam coupled to the second sidewall, wherein the bench seat engages the second support beam between the third and fourth seating assemblies when in the cross support position.

18. The vehicle of claim 1, further comprising:
an extension configured to extend from at least one of the first and second seating assemblies and at least partially over the wheel housing, wherein the bench seat is configured to rest on the extension.

19. The vehicle of claim 1, further comprising:
a table feature selectively positionable in an adjacent support between the first and second seating assemblies and a cross support position between the first and second sidewalls.

* * * * *